US011397405B2

(12) United States Patent
Ozcan et al.

(10) Patent No.: US 11,397,405 B2
(45) Date of Patent: *Jul. 26, 2022

(54) METHOD AND SYSTEM FOR PIXEL SUPER-RESOLUTION OF MULTIPLEXED HOLOGRAPHIC COLOR IMAGES

(71) Applicant: THE REGENTS OF THE UNIVERSITY OF CALIFORNIA, Oakland, CA (US)

(72) Inventors: Aydogan Ozcan, Los Angeles, CA (US); Yichen Wu, Los Angeles, CA (US); Yibo Zhang, Los Angeles, CA (US); Wei Luo, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 26 days.

This patent is subject to a terminal disclaimer.

(21) Appl. No.: 17/006,057

(22) Filed: Aug. 28, 2020

(65) Prior Publication Data
US 2020/0393793 A1 Dec. 17, 2020

Related U.S. Application Data

(63) Continuation of application No. 16/300,546, filed as application No. PCT/US2017/031984 on May 10, 2017, now Pat. No. 10,795,315.
(Continued)

(51) Int. Cl.
*G03H 1/04* (2006.01)
*H04N 9/04* (2006.01)
(Continued)

(52) U.S. Cl.
CPC ......... *G03H 1/0443* (2013.01); *G03H 1/0005* (2013.01); *G03H 1/04* (2013.01);
(Continued)

(58) Field of Classification Search
CPC ...... G03H 1/0443; G03H 1/0005; G03H 1/04; G03H 1/2249; G03H 2001/005;
(Continued)

(56) References Cited

U.S. PATENT DOCUMENTS 8,325,400 B2 12/2012 Chen et al.
8,842,901 B2 9/2014 Ozcan et al.
(Continued)

OTHER PUBLICATIONS

Sanz et al., ("Improved quantitative phase imaging in lensless microscopy by single-shot multi-wavelength illumination using a fast convergence algorithm", Aug. 10, 2015 | vol. 23, No. 16 | DOI:10.1364/OE.23.021352 | Optics express 21352), (Year: 2015).*
(Continued)

*Primary Examiner* — Amara Abdi
(74) *Attorney, Agent, or Firm* — Vista IP Law Group LLP

(57) ABSTRACT

A method of generating a color image of a sample includes obtaining a plurality of low resolution holographic images of the sample using a color image sensor, the sample illuminated simultaneously by light from three or more distinct colors, wherein the illuminated sample casts sample holograms on the image sensor and wherein the plurality of low resolution holographic images are obtained by relative x, y, and z directional shifts between sample holograms and the image sensor. Pixel super-resolved holograms of the sample are generated at each of the three or more distinct colors. De-multiplexed holograms are generated from the pixel super-resolved holograms. Phase information is retrieved from the de-multiplexed holograms using a phase retrieval algorithm to obtain complex holograms. The complex hologram for the three or more distinct colors is digitally combined and back-propagated to a sample plane to generate the color image.

20 Claims, 14 Drawing Sheets

Related U.S. Application Data

(60) Provisional application No. 62/334,671, filed on May 11, 2016.

(51) Int. Cl.
| | | |
|---|---|---|
| *G03H 1/00* | (2006.01) | |
| *G03H 1/22* | (2006.01) | |
| *G06T 3/40* | (2006.01) | |
| *H04N 5/232* | (2006.01) | |
| *H04N 9/68* | (2006.01) | |
| *H04N 9/73* | (2006.01) | |

(52) U.S. Cl.
CPC ......... *G03H 1/2249* (2013.01); *G06T 3/4053* (2013.01); *H04N 5/23232* (2013.01); *H04N 9/0455* (2018.08); *H04N 9/68* (2013.01); *H04N 9/73* (2013.01); *G03H 2001/005* (2013.01); *G03H 2001/0447* (2013.01); *G03H 2001/2271* (2013.01); *G03H 2210/13* (2013.01); *G03H 2210/55* (2013.01); *G03H 2222/13* (2013.01); *G03H 2223/15* (2013.01); *G03H 2223/52* (2013.01); *G03H 2227/03* (2013.01); *G03H 2240/56* (2013.01)

(58) Field of Classification Search
CPC ... G03H 2001/0447; G03H 2001/2271; G03H 2210/13; G03H 2210/55; G03H 2222/13; G03H 2223/15; G03H 2223/52; G03H 2227/03; G03H 2240/56; G03H 2001/046; G06T 3/4053; H04N 5/23232; H04N 9/0455; H04N 9/68; H04N 9/73
See application file for complete search history.

(56) References Cited

U.S. PATENT DOCUMENTS

| | | | |
|---|---|---|---|
| 8,866,063 B2 | 10/2014 | Ozcan et al. | |
| 8,874,403 B2 | 10/2014 | Ozcan et al. | |
| 8,916,390 B2 | 12/2014 | Ozcan et al. | |
| 9,007,433 B2 | 4/2015 | Ozcan et al. | |
| 9,057,702 B2 | 6/2015 | Ozcan et al. | |
| 9,170,599 B2 | 10/2015 | Ozcan et al. | |
| 9,202,835 B2 | 12/2015 | Ozcan | |
| 9,331,113 B2 | 5/2016 | Ozcan et al. | |
| 9,588,030 B2 | 3/2017 | Gimenez | |
| 9,588,037 B2 | 3/2017 | Ozcan et al. | |
| 9,605,941 B2 | 3/2017 | Ozcan et al. | |
| 9,683,938 B2 | 6/2017 | Ozcan et al. | |
| 9,715,099 B2 | 7/2017 | Ozcan et al. | |
| 9,767,341 B2 | 9/2017 | Ozcan et al. | |
| 10,088,663 B2 | 10/2018 | Ozcan et al. | |
| 2007/0183011 A1* | 8/2007 | Yamauchi | G03H 1/26 359/22 |
| 2012/0148141 A1 | 6/2012 | Ozcan et al. | |
| 2012/0157160 A1 | 6/2012 | Ozcan et al. | |
| 2012/0218379 A1 | 8/2012 | Ozcan et al. | |
| 2012/0248292 A1* | 10/2012 | Ozcan | G03H 1/0866 250/208.1 |
| 2013/0092821 A1 | 4/2013 | Ozcan et al. | |
| 2013/0157351 A1 | 6/2013 | Ozcan et al. | |
| 2013/0193544 A1 | 8/2013 | Ozcan et al. | |
| 2013/0203043 A1 | 8/2013 | Ozcan et al. | |
| 2013/0258091 A1 | 10/2013 | Ozcan et al. | |
| 2013/0280752 A1* | 10/2013 | Ozcan | G01B 9/02041 356/482 |
| 2014/0120563 A1 | 5/2014 | Ozcan et al. | |
| 2014/0160236 A1 | 6/2014 | Ozcan et al. | |
| 2014/0300696 A1* | 10/2014 | Ozcan | G06T 3/0068 348/40 |
| 2015/0111201 A1 | 4/2015 | Ozcan et al. | |
| 2015/0153558 A1 | 6/2015 | Ozcan et al. | |
| 2015/0204773 A1 | 7/2015 | Ozcan et al. | |
| 2015/0332473 A1* | 11/2015 | Cao | G06T 5/003 382/255 |
| 2016/0011564 A1* | 1/2016 | Tanabe | G03H 1/041 359/11 |
| 2016/0070092 A1 | 3/2016 | Ozcan et al. | |
| 2016/0161409 A1 | 6/2016 | Ozcan et al. | |
| 2016/0327473 A1 | 11/2016 | Ozcan et al. | |
| 2016/0334614 A1 | 11/2016 | Ozcan et al. | |
| 2017/0153106 A1 | 6/2017 | Ozcan et al. | |
| 2017/0160197 A1 | 6/2017 | Ozcan et al. | |
| 2017/0168285 A1 | 6/2017 | Ozcan et al. | |
| 2017/0220000 A1 | 8/2017 | Ozcan et al. | |
| 2017/0357083 A1 | 12/2017 | Ozcan et al. | |
| 2018/0288504 A1 | 10/2018 | Yang et al. | |

OTHER PUBLICATIONS

Hardie et al., Joint MAP Registration and High-Resolution Image Estimation Using a Sequence of Undersampled Images, IEEE, vol. 6 No. 12, Dec. 1997.

Ozcan et al., Ultra wide-filed lens-free monitoring of cells on-chip, Lab on Chip 8, 89-106, Nov. 1, 2007.

Ozcan et al., Lens-free On-Chip Cytometry Rfor wireless Health Diagnosis, IEEE LEOS Newsletter, Oct. 2008.

Seo et al., Lensfree On-chip Cytometry Using Tunable Monochromatic Illumination and Digital Noise Reduction, Multi-color LUCAS, Sep. 2008.

Seo et al., Lensfree holographic imaging for on-chip cytometry and diagnostics, Lab on a Chip, 9, 777-787, Dec. 5, 2008.

Su et al., Towards Wireless Health: Lensless On-Chip Cytometry, Biophotonics, Dec. 2008.

Su et al., High-Throughput Lensfree Imaging and Characterization of Heterogeneous Cell Solution On a Chip, Biotechnology and Bioengineering, Sep. 8, 2008.

Isikman et al., Lensfree Cell Holography On a Chip: From Holographic Cell Signatures to Microscopic Reconstruction, LEOS Annual Meeting Conf. Proceedings, Oct. 2009.

Mudanyali et al., Lensless On-chip Imaging of Cells Provides a New Tool for High-throughput Cell-Biology and Medical Diagostics, Journal of Visualized Experiments, Dec. 14, 2009.

Bishara et al., Lensfree on-chip microscopy over a wide field-of-view using pixel super-resolution, Optics Express, vol. 18 No. 11, May 24, 2010.

Coskun et al., Wide field-of-view lens-free fluorescent imaging on a chip, Lab Chip, 10(7), 824-827, Apr. 7, 2010.

Coskun et al., Lensless wide-field fluorescent imaging on a chip using compressive decoding of sparse objects, Optics Express, vol. 18 No. 10, May 5, 2010.

Khademhosseinieh et al., Lensfree color imaging on a nanostructured chip using compressive decoding, Applied Physics Letters, 97, 211112-1, Nov. 24, 2010.

Khademhosseinieh et al., Lensfree on-chip imaging using nanostructured surfaces, Applied Physics Letters, 96, 171106, Apr. 30, 2010.

Mudanyali et al., Compact, light-weight and cost-effective microscope based on lensless incoherent holography for telemedicine applications, Lab Chip, 10, 1417-1428, Apr. 19, 2010.

Ozcan, Smart technology for global access to healthcare, SPIE, Mar. 16, 2010.

Ozcan et al., Lensfree on-chip holography facilitates novel microscopy applications, SPIE, May 19, 2010.

Bishara et al., Holographic pixel super-resolution in portable lensless on-chip microscopy using a fiber-optic array, Lab on a Chip, 11, 1276-1279, Mar. 1, 2011.

Lee et al., Field-portable reflection and transmission microscopy based on lensless holography, Biomedical Optics Express, vol. 2, No. 9, Aug. 30, 2011.

J. L. Pech-Pacheco et al., "Diatom Autofocusing in Brightfield Microscopy: a Comparative Study," in Pattern Recognition, International Conference On (IEEE Computer Society, 2000), vol. 3, p. 3318 (2000).

Oh et al., On-chip differential interference contrast microscopy using lensless digital holography, Optics Express, vol. 18, No. 5, 4717-4726 (2010).

(56) References Cited

OTHER PUBLICATIONS

L. J. Allen and M. P. Oxley, Optics Communications, 199, 65-75 (2001).
Greenbaum et al., Wide-field computational color imaging using pixel super-resolved on chip microscopy, Optics Express, vol. 21, No. 10, 12469-483 (2013).
Greenbaum et al., Maskless imaging of dense samples using pixel super-resolution based multi-height lensfree on-chip microscopy, Optics Express, vol. 20, No. 3, 3129-3143 (2012).
Greenbaum et al., Field-Portable Pixel Super-Resolution Colour Microscope, PLos One 8(9): e76475 (2013).
Greenbaum et al., Increased space-bandwidth product in pixel super-resolved lensfree on-chip microscopy, Scientific Reports, 3: 1717(2013).
Greenbaum et al., Imaging without lenses: achievements and remaining challenges of wide-field on-chip microscopy, Nat Methods. 9(9) (2012).
Göröcs, Z., Kiss, M., Toth, V., Orzó, L. & Tokés, S. Multicolor digital holographic microscope (DHM) for biological purposes, in BiOS 75681P-75681P (International Society for Optics and Photonics, 2010).
Ramanath, R., Snyder, W. E., Bilbro, G. L. & Sander, W. A. Demosaicking methods for Bayer color arrays. J. Electron. Imaging 11, 306-315 (2002).
PCT International Search Report for PCT/US2017/031984, Applicant: The Regents of the University of California, Form PCT/ISA/210 and 220, dated Jul. 31, 2017 (4pages).
PCT Written Opinion of the International Search Authority for PCT/US2017/031984, Applicant: The Regents of the University of California, Form PCT/ISA/237, dated Jul. 31, 2017 (9pages).
Sanz, M. et al., Improved quantitative phase imaging in lensless microscopy by single-shot multi-wavelength Illumination using a fast convenience algorith, vol. 23, Issue 16, pp. 21352-21365, 2015 [retrieved from internet on Jul. 14, 2017, https://www.osapublishing.org/oe/abstract.cfm?uri=oe-23-16-21352, DOI: 10.1364/OE.23.021352.
Greenbaum et al., Wide-field computational imaging of pathology slides using lens-free on chip microscopy, www.ScienceTranslationalMedicine.org, Dec. 17, 2014, vol. 6, Issue 267, 267ra175 (23pages).
PCT International Preliminary Report on Patentability (Chapter I of the Patent Cooperation Treaty) for PCT/US2017/031984, Applicant: The Regents of the University of California, Form PCT/IB/326 and 373, dated Nov. 22, 2018 (7 pages).
Sanz et al., Improved quantitative phase imaging in lensless imcroscopy by single-shot multi-wavelength illumination using a fast convergence algorithm, Aug. 10, 2015, vol. 23, No. 16, DOI:10.1364/OE.23.021352, Optics Express 21352 (2015).

* cited by examiner

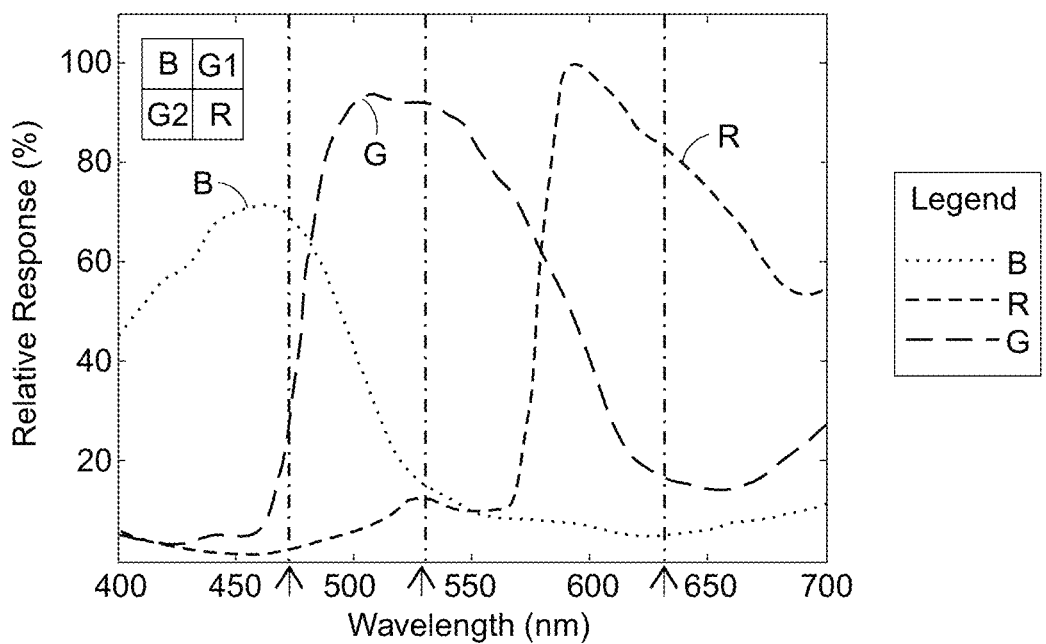
FIG. 6A
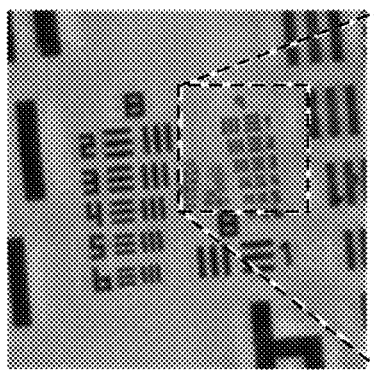
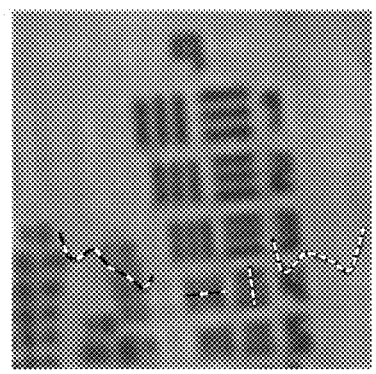
FIG. 6B    FIG. 6C
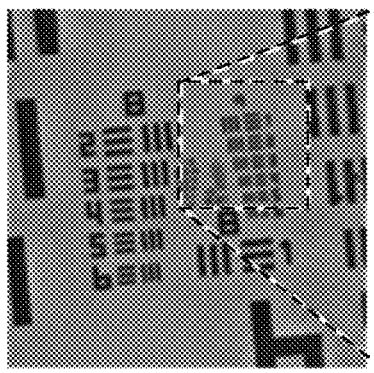
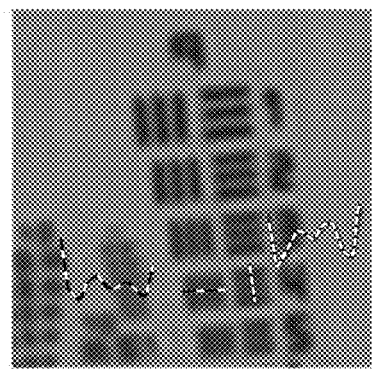
FIG. 6D    FIG. 6E

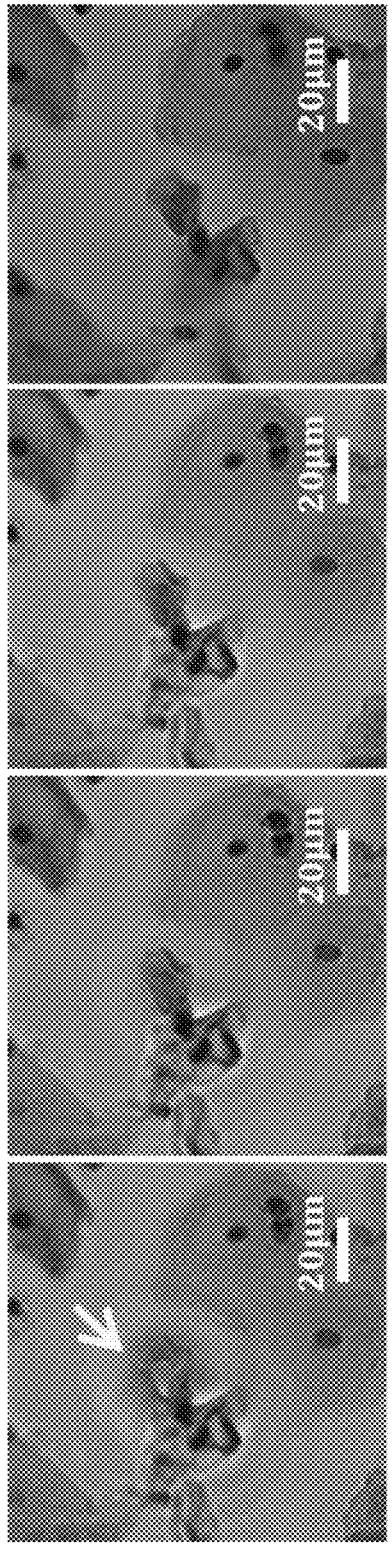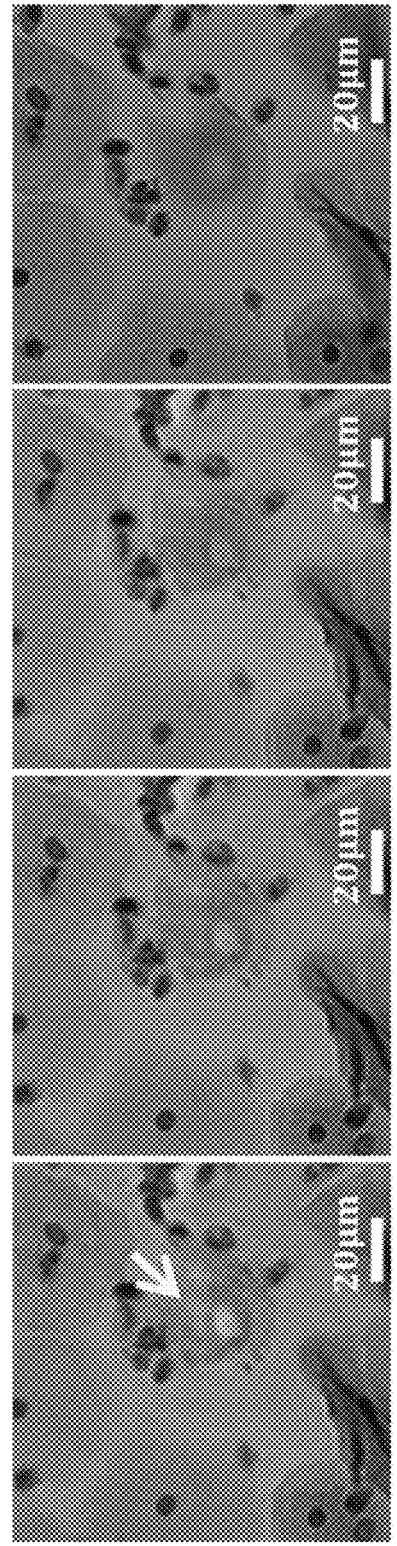
FIG. 7A  FIG. 7B  FIG. 7C  FIG. 7D
FIG. 7E  FIG. 7F  FIG. 7G  FIG. 7H

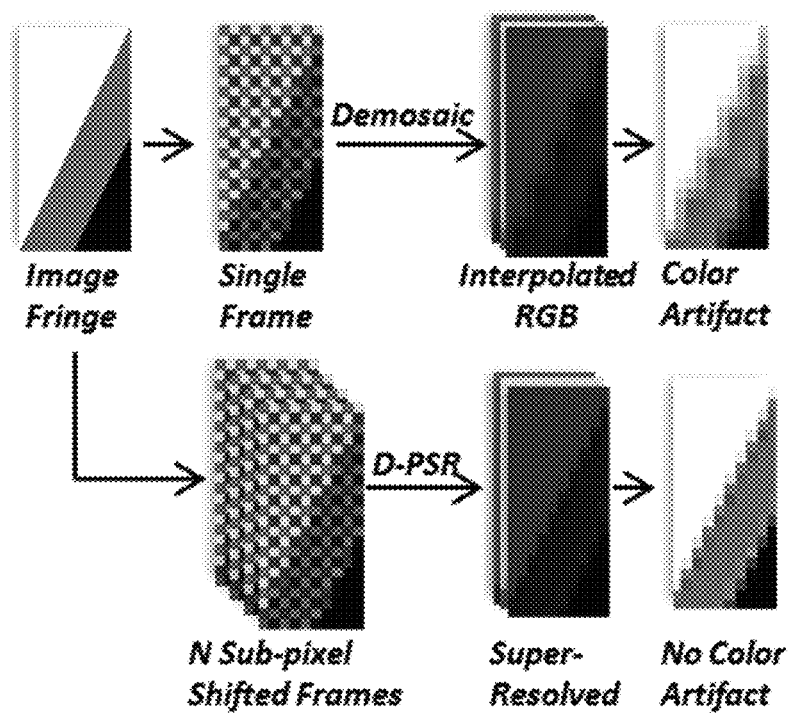
FIG. 10A
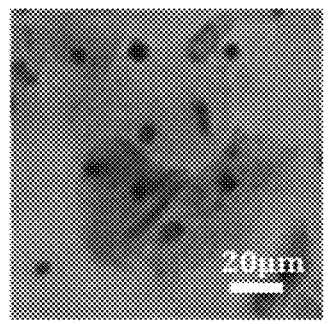
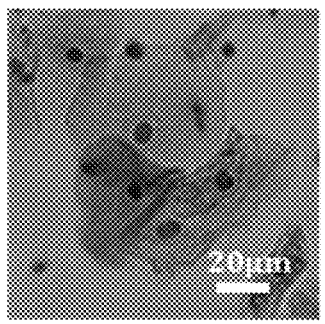
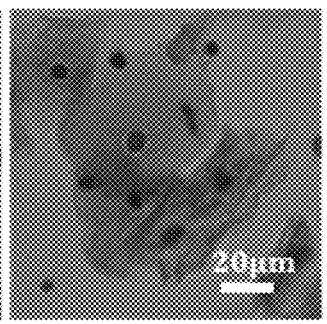
FIG. 10B    FIG. 10C    FIG. 10D
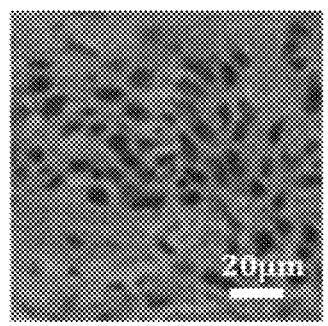
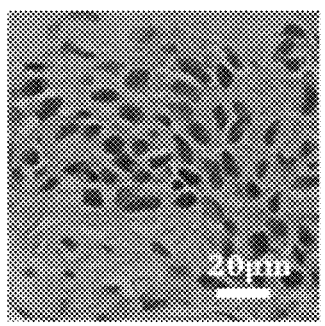
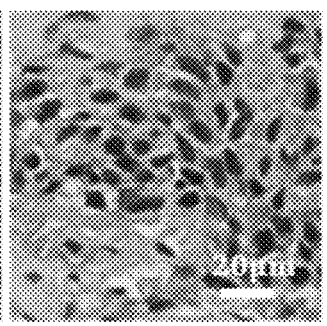
FIG. 10E    FIG. 10F    FIG. 10G

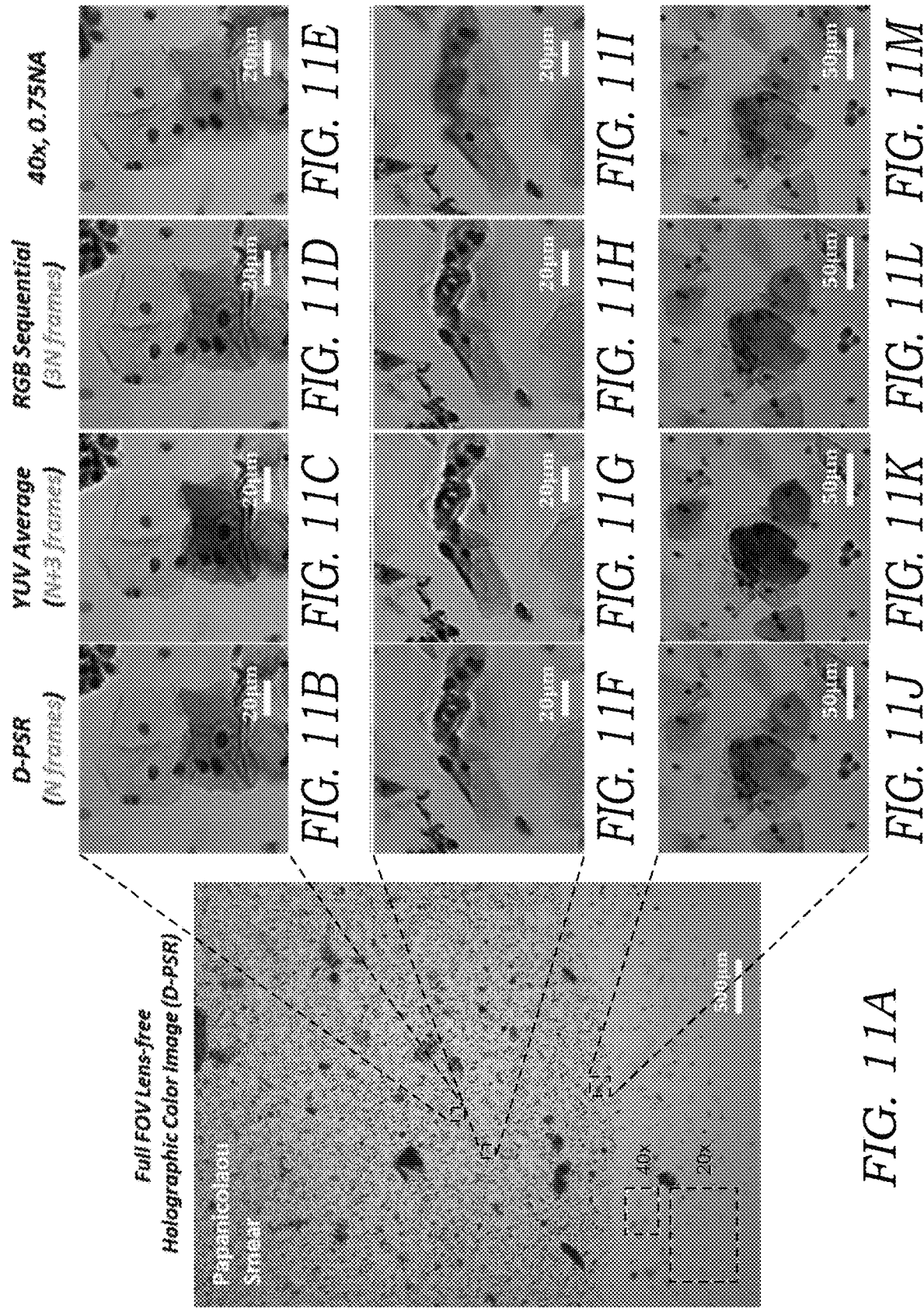

METHOD AND SYSTEM FOR PIXEL SUPER-RESOLUTION OF MULTIPLEXED HOLOGRAPHIC COLOR IMAGES

RELATED APPLICATION

This Application is a continuation of U.S. application Ser. No. 16/300,546, filed on Nov. 9, 2018, now issued as U.S. Pat. No. 10,795,315, which is a U.S. National Stage filing under 35 U.S.C. § 371 of International Application No. PCT/US2017/031984, filed May 10, 2017, which claims priority to U.S. Provisional Patent Application No. 62/334,671 filed on May 11, 2016, which are hereby incorporated by reference. Priority is claimed pursuant to 35 U.S.C. §§ 119, 371 and any other applicable statute.

TECHNICAL FIELD

The technical field generally relates methods and devices for obtaining colored, microscopic images obtained from holographic images generated from multiple different wavelengths. In particular, the technical field relates to using pixel super-resolution in conjunction with color de-multiplexing for simultaneous multiplex illumination.

BACKGROUND

Computational microscopy modalities are becoming more and more powerful thanks to the rapid improvements in digital imaging chips, graphics processing units as well as emerging image reconstruction methods that enable high-resolution imaging over large sample areas and volumes. Among these different computational microscopy techniques, digital holography is one of the most widely explored modalities as it permits high-throughput 3D imaging of phase and amplitude information of specimen. Holographic microscopy in general demands spatial and temporal coherence of illumination, although partially-coherent or even incoherent sources can also be utilized in certain imaging designs. To achieve color imaging in digital holography various methods have been employed. One of the most commonly used approaches captures three holograms at different wavelengths sequentially, at red (e.g., 610-650 nm), green (e.g., 520-560 nm) and blue (e.g., 450-480 nm) parts of the spectrum, and then digitally cross-registers and combines these holograms to reconstruct a color image of the specimen. The sequential illumination method requires additional time to acquire images at the different wavelengths. In addition, each sequential imaging operation generates data corresponding to the particular illumination wavelength; making the sequential process data-intensive.

As an alternative to this sequential color illumination method, simultaneous multi-wavelength illumination of the sample has also been utilized in combination with a color image sensor chip (e.g., with a Bayer color-filter array, CFA) to digitize the resulting multi-color hologram in one snapshot. Using the known transmission spectra of the red (R), green (G) and blue (B) filters of the Bayer CFA, three sets of holograms corresponding to three unique wavelengths can be digitally retrieved through an inverse mapping (i.e., de-multiplexing) algorithm. Compared to sequential color illumination, this simultaneous illumination approach saves experimental time through digital de-multiplexing of color channels; however, the reconstructed color images are lower resolution and exhibit color artifacts. Unlike natural images, holograms contain rapidly changing oscillations/fringes and because different channels of the color filters of a Bayer pattern are not exactly at the same spatial location, the traditional Bayer demosaicing process, when dealing with the sharp oscillations of a hologram, causes severe fringe artifacts, which become even more noticeable for wide-field holographic imaging systems with large effective pixels or small magnifications. To better handle such sampling artifacts, different Bayer demosaicing approaches have also been proposed, however, these methods still suffer from the problem of creating an artifact-free de-multiplexing of holographic high frequency fringes created by multi-wavelength illumination.

SUMMARY

In one embodiment, to address the sampling and de-multiplexing related challenges noted above in holographic color imaging, a new high-resolution color microscopy technique is introduced that is termed Demosaiced Pixel Super-Resolution (D-PSR). In this D-PSR approach, a plurality of raw holograms a first captured on a Bayer color image sensor chip (or other color image sensor with CFA) using simultaneous or multiplexed multi-wavelength illumination, where the sensor plane, the sample, or the light source is shifted by small (sub-pixel) increments in the x and y directions (generally parallel to the plane of the active surface of the color image sensor chip). Pixel super-resolution is then performed based on these sub-pixel shifted raw holograms to digitally synthesize smaller "effective" pixels (e.g., by a factor of ~3 fold) for each color element of the Bayer CFA. Using the pre-calibrated spectral cross-talk matrix of each filter of the Bayer CFA at the selected illumination wavelengths, the three color channels are then de-multiplexed, each of which is also pixel super-resolved. Complex projection images are digitally reconstructed using an iterative phase recover process which can be used to back propagate to the object or sample plane to generate the final color image. This D-PSR approach solves Bayer CFA related spatial sampling limitations and color artifacts of previous color de-multiplexing approaches, significantly improving the performance of holographic high-resolution color imaging.

For experimental demonstration of the D-PSR approach lens-free holographic on-chip imaging was selected, where the sample is placed on the top of or adjacent to a Bayer color image sensor chip, typically at a distance of ~0.3-1 mm away from the chip surface. In this unit magnification transmission imaging set-up on a chip, the sample field-of-view (FOV) is equal to the active area of the color image sensor chip, which is typically ~20-30 $mm^2$ using a state-of-the-art CMOS color image sensor chip. As a result of this unique imaging configuration, the FOV and resolution are decoupled from each other and partially coherent sources can be utilized to push the resolution of the reconstructed holograms to the diffraction limit. Another important advantage of this on-chip holographic imaging approach is the compactness and cost-effectiveness of its set-up, which makes it highly suitable for telemedicine applications and field use. Since this is an in-line holographic imaging geometry, the twin-image noise that is characteristic of an in-line set-up needs to be eliminated; a multi-height based phase retrieval approach was used for this purpose. D-PSR achieves a color imaging performance that is comparable to sequential illumination of the sample at three distinct wavelengths (corresponding to R, G and B channels) and therefore improves the overall speed of holographic color imaging. Finally, it should be emphasized that this D-PSR technique is broadly applicable to any holographic microscopy application (lens-based or lens-free), where high-resolution imaging and simultaneous multi-wavelength illumination are sought.

In one embodiment, a method of generating a color image of a sample includes the operations of obtaining a plurality of low resolution holographic images of the sample using a color image sensor that has a color filter array (CFA), the sample illuminated simultaneously by electromagnetic radiation or light from three or more distinct colors, wherein the illuminated sample casts sample holograms on the color image sensor and wherein the plurality of low resolution holographic images are obtained by relative x, y, and z directional shifts between sample holograms and the color image sensor. A pixel super-resolved hologram of the sample is generated at each of the three or more distinct colors using the plurality of low resolution holographic images obtained by simultaneous illumination of the sample by light from the three or more distinct colors. De-multiplexed pixel super-resolved holograms are then generated at each of the three or more distinct colors using the pixel super-resolved hologram resulting from the simultaneous multi-color illumination. Phase information is then retrieved from the de-multiplexed holograms at each of the three or more distinct colors using a phase retrieval algorithm to obtain a complex hologram corresponding at each of the three or more distinct colors. The complex hologram for the three or more distinct colors is digitally back-propagated and reconstructed to a sample plane to generate the color image of the sample by combining the reconstruction results of each of the three or more distinct colors.

In another embodiment, a system for generating color images of a sample includes an optically transparent sample holder configured to hold the sample thereon; one or more light sources configured to simultaneously output at least three different colors at a distance $z_1$ from the sample on a first side of the sample holder; a color image sensor having a color filter array (CFA), the color image sensor disposed on a second side of the sample holder and having an active surface thereof located at a distance $z_2$ from the sample, wherein $z_2$ is significantly smaller than $z_1$ (i.e., $z_2 \ll$ than $z_1$); and one or more processors configured to execute image processing software thereon.

The image processing software obtains a plurality of low resolution holographic images of the sample using the color image sensor, wherein the simultaneously illuminated sample casts sample holograms on the color image sensor and wherein the plurality of low resolution holographic images are obtained by relative x, y, and z directional shifts between sample holograms and the color image sensor. The software generates a pixel super-resolved hologram of the sample using the plurality of low resolution holographic images obtained by simultaneous illumination followed by generating de-multiplexed pixel super-resolved holograms at each of the at least three different colors using the pixel super-resolved hologram obtained from the multi-color, simultaneous illumination. Phase information is then retrieved from the de-multiplexed holograms at each of the at least three different colors using a phase retrieval algorithm to obtain a complex hologram at each of the three or more distinct colors. Finally, the image processing software digitally back-propagates and reconstructs the complex hologram for each of the at least three different colors to a sample plane to generate the color image of the sample by combining the reconstruction results of each of the three or more distinct colors.

In one embodiment, the microscope imaging system is configured as a benchtop or desktop device. In another embodiment, the microscope imaging system is configured as a hand-held or portable device that uses a modular attachment in conjunction with a portable electronic device such as a mobile phone (e.g., Smartphone), tablet computer, webcam, laptop, or the like.

BRIEF DESCRIPTION OF THE DRAWINGS

FIG. 6A illustrates measured spectra of B, G1, G2 (G1 and G2 substantially overlap) and R channels of the Bayer color image sensor, showing ~15% cross-talk at the multiplexed wavelengths in the experiments described herein (also see Table 1).

FIGS. 6B and 6C show reconstruction of a resolution test chart using wavelength-multiplexed illumination with pixel super-resolution without the de-multiplexing step. Significant distortions in high-resolution features are observed, as also shown with highlighted cross-sections.

FIGS. 6D and 6E illustrate reconstruction of the same data set of FIGS. 6B and 6C with digital de-multiplexing (D-PSR). Previously unresolvable spatial features can now be resolved.

FIGS. 7A-7H illustrate the impact of saturation correction in D-PSR images. Two different fields of view are illustrated in the upper panel of images (FIGS. 7A-7D) and the lower panel of images (FIGS. 7E-7H). FIGS. 7A and 7E illustrate D-PSR based image reconstruction without saturation correction. FIGS. 7B and 7F illustrate D-PSR based image reconstruction with the saturation correction step. FIGS. 7C and 7G illustrate the same regions of interest reconstructed using sequential RGB illumination (prior art), with a 3-fold increased number of raw holograms. FIGS. 7D and 7H illustrate the same samples imaged using a lens-based microscope (40×, 0.75NA). Examples of prominent color artifacts are marked with arrows in FIGS. 7A and 7E.

FIG. 10A compares a conventional demosaicing process (upper branch) that generates color artifacts at holographic fringes, which are avoided in D-PSR (lower branch).

FIG. 10B illustrates a reconstructed image of a stained Pap smear sample using multi-height phase retrieval based hologram reconstruction from four heights using conventional demosaicing. A single hologram is captured under multi-wavelength illumination at each height.

FIG. 10C illustrates a reconstructed image of a stained Pap smear sample using multi-height phase retrieval based hologram reconstruction from four heights using D-PSR. 6×6 sub-pixel shifted holograms are captured under multi-wavelength illumination at each height.

FIG. 10D is a microscope image of the same regions of interest from FIGS. 10A and 10B using a 40×, 0.75 NA objective lens.

FIG. 10E illustrates a reconstructed image of a stained breast cancer tissue sample using multi-height phase retrieval based hologram reconstruction from four heights using conventional demosaicing. A single hologram is captured under multi-wavelength illumination at each height.

FIG. 10F illustrates a reconstructed image of a stained breast cancer tissue sample using multi-height phase retrieval based hologram reconstruction from four heights using D-PSR. 6×6 sub-pixel shifted holograms are captured under multi-wavelength illumination at each height.

FIG. 10G is a microscope image of the same regions of interest from FIGS. 10E and 10F using a 40×, 0.75 NA objective-lens.

FIG. 11A illustrates a full field-of-view lens-free holographic image that is reconstructed using D-PSR under wavelength-multiplexed illumination at 470 nm, 527 nm and 624 nm. N=144 raw holograms are used for this reconstruction.

FIG. 11B illustrate a magnified region of FIG. 11A.

FIG. 11C illustrates the same magnified region-of-interest of FIG. 11B reconstructed using the YUV color-space averaging method. N+3=147 raw holograms are used. YUV color-space averaging method shows intensity bias and color leakage artifacts.

FIG. 11D illustrates the same magnified region-of-interest of FIG. 11B reconstructed using sequential RGB illumination. 3N=432 raw holograms are used.

FIG. 11E illustrates the same magnified region-of-interest of FIG. 11B obtained using a lens-based microscope. These microscope images are blurred in some regions due to limited depth-of-focus of the objective-lens compared to lens-free holographic imaging. Typical FOVs of a 40× and a 20× objective-lens are also shown in FIG. 11A.

FIG. 11F illustrate a different magnified region of FIG. 11A.

FIG. 11G illustrates the same magnified region-of-interest of FIG. 11F reconstructed using the YUV color-space averaging method.

FIG. 11H illustrates the same magnified region-of-interest of FIG. 11F reconstructed using sequential RGB illumination.

FIG. 11I illustrates the same magnified region-of-interest of FIG. 11F

FIG. 11J illustrate a different magnified region of FIG. 11A.

FIG. 11K illustrates the same magnified region-of-interest of FIG. 11J reconstructed using the YUV color-space averaging method.

FIG. 11L illustrates the same magnified region-of-interest of FIG. 11J reconstructed using sequential RGB illumination.

FIG. 11M illustrates the same magnified region-of-interest of FIG. 11J.

DETAILED DESCRIPTION OF THE ILLUSTRATED EMBODIMENTS

Figure 1A:
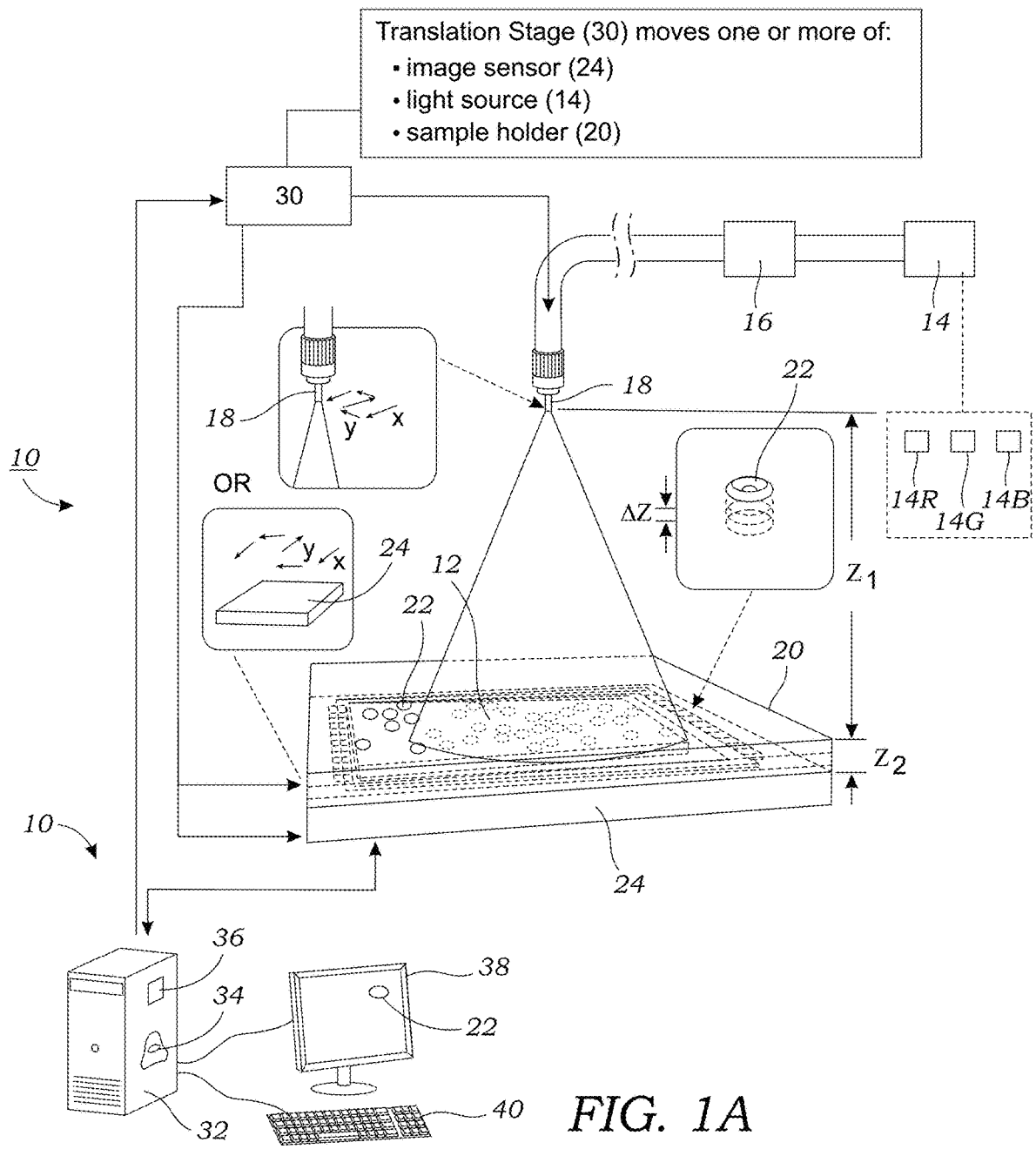
FIG. 1A illustrates one embodiment of a lens-free microscope system that is used to simultaneously illuminate a sample with a plurality of different wavelengths (e.g., colors); whereby a plurality of lens-free color images are captured by a color image sensor having a CFA. Pixel super-resolved images are de-multiplexed and computationally reconstructed to generate the final color image of the sample.

FIG. 1A illustrates one embodiment of a microscope system 10 that is used to generate color images of a sample 12. The sample 12 may include, for example, a tissue sample such as a thinly sliced tissue preparation that is commonly used in histological and pathology applications. For example, the sample 12 may include a histology or pathology slide that contains tissue that is fixed and stained prior to visualization. Certain stains, for example, can be used so that certain cellular organelles or features can be highlighted (e.g., cell nuclei as one example). In this embodiment, the microscope system 10 is a lens-free microscope device that includes a broadband light source 14 that includes a filter 16, such as an acousto-optic tunable filter that is coupled to an optical fiber 18 (e.g., single mode fiber). The broadband light source 14 in conjunction with the filter 16 is able to simultaneously output a plurality of different colors or wavelengths of light. In one particular preferred embodiment of the invention, three (3) different colors or channels of light are emitted by the optical fiber 18 and onto the sample 12. In one preferred embodiment, the three (3) different colors include red (R) light, green (G) light, and blue (B) light. It should be understood that the colors red, green and blue each span a range of wavelengths. For example, red light is light that has a wavelength within the range of about 610 nm to about 750 nm. Green light is light that has a wavelength within the range of about 495 nm to about 570 nm. Blue light is light that has a wavelength within the range of about 450 to about 495 nm.

Thus, as used herein, the concepts of "red," "green," or "blue" light or red, green, or blue channels means that the light has a wavelength generally within or close to the above-noted ranges. In some instances, the red, green, or blue light may include a single or narrow spectral band that spans one to a few nm. In other instances, the red, green, or blue light may span a larger range; yet still fall within the wavelength ranges described above.

As an alternative to a single light source 14 that is used to generate a plurality of different colors or wavelengths of light, multiple light sources (e.g., light sources 14R, 14B, 14G as seen in FIG. 1A) may be used to simultaneous illuminate the sample 12. In this example, light source 14R emits red colored light while light source 14B emits blue colored light and light source 14G emits green colored light. In this particular alternative embodiment, the different light sources 14R, 14B, 14G may be formed using multiple light emitting diodes (LEDs) or laser diodes. These light sources 14R, 14B, 14B are coupled to conventional driving circuitry (not shown) to simultaneously illuminate the sample 12. Regardless of the form of the light source 14, the light is partially coherent light that illuminates the sample 12.

The sample 12 is located on the sample holder 20. The sample holder 20 is an optically transparent substrate such as glass or plastic that is used to hold a sample 12. For example, the sample holder 20 may include a glass slide or glass slip that is typically used to hold histological or pathological samples. The sample 12 that is contained on the sample holder 20 includes objects 22 therein that are imaged by the lens-free microscope system 10. The lens-free microscope 10 is free of imaging forming units such as lenses, lens sets, lens modules, mirrors, or combinations of the same. These objects 22 may include sub-cellular level objects or features (e.g., nuclei, organelles, and the like). Of course, the sample 12 may also include a sample of non-biological origin.

Figure 2:
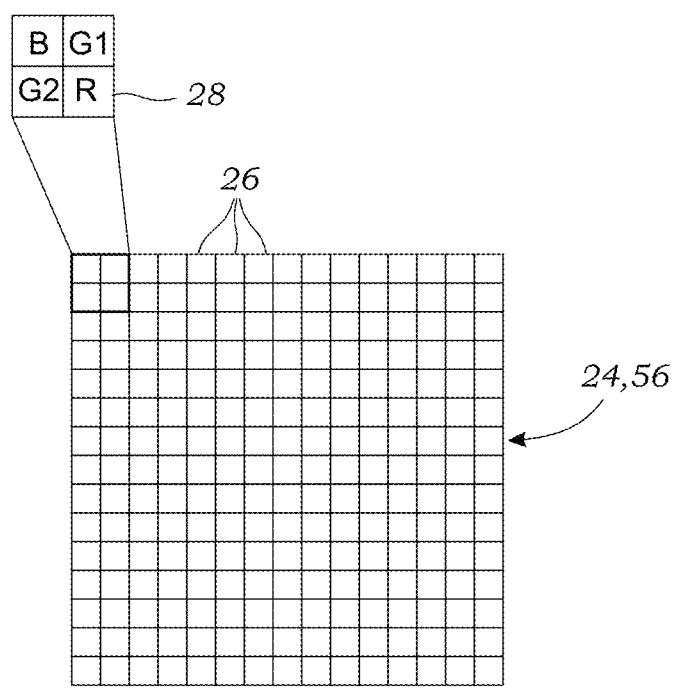
FIG. 2 illustrates an example of a CFA (e.g., Bayer) that is used in conjunction with a color image sensor.

The lens-free microscope system 10 includes a color image sensor 24 that is located adjacent to the underside of the sample holder 20. The color image sensor 24 may be CMOS-based and includes an array of pixels 26 as seen in FIG. 2. In some instances, the underside of the sample holder 20 may actually be in contact with the color image sensor 24. The color image sensor 24 includes a color filter array (CFA) 28. The particular CFA that is used by the image sensor 24 may vary. Examples include a Bayer filter, RGBE filter, CYYM filter, CYGM filter, RGBW Bayer filter, and RGBW filter. FIG. 2 illustrates a color image sensor 24 that includes a Bayer CFA. As seen in FIG. 2, each pixel 26 of this color image sensor 24, in response to the Bayer CFA 28 has four channels, namely B (Blue), G1 (Green 1), G2 (Green 2), and R (Red), which form a 2×2 period of the Bayer pattern on the color image sensor 24. Each channel of the Bayer CFA 28 operates as a filter to permit the transmission of a different range of wavelengths. Each channel of the CFA 28 has different transmission spectra.

The distance between the output of the partially coherent light source 14 (or multiple sources 14R, 14G, 14B) and the sample 12 referred to as the $z_1$ distance is generally on the order of several centimeters (e.g., ~5-15 cm). The active surface (i.e., imaging surface) of the color image sensor 24 is located a distance $z_2$ below the sample 12 and is significantly smaller as compared to the $z_1$ distance (i.e., $z_2 \ll z_1$). The typical distance for the $z_2$ dimension is generally less than 1 mm and, in other embodiments, between about 100 µm to about 600 µm. The color image sensor 24 in the lens-free microscope system 10 is used to capture holographic images of objects 22 and features contained in the sample 12. Objects 22 may include sub-cellular features such as organelles or the like (e.g., nuclei) that are present in the sample 12. Objects 22 may also include non-biological objects such as beads, etc.

With reference to FIG. 1A, the lens-free microscope system 10 further includes, in one embodiment, a translation stage 30 that, in one embodiment, is coupled to the color image sensor 24 and moves the color image sensor 24 in the x or y directions which lie in a plane that is substantially parallel with the active surface of the color image sensor 24 or in the z direction which, as illustrated, is generally orthogonal to the plane of the active surface of the color image sensor 24. Movement in the x or y directions is used to capture images of the sample 12 using pixel super-resolution. In order to generate super-resolved images, a plurality of different, lower resolution images are taken as color image sensor 24 is moved in small increments in the x and y directions. In another alternative embodiment, the optical fiber 18 is moved in small increments generally in the x and y directions by the translation stage 30. In yet another alternative, the sample holder 20 may be moved in small increments in the x and y directions. The translation stage 30 may, optionally, be automatically controlled using a computer 32, dedicated controller, or the like to control an actuating element. Manual control of the translation stage 30 is also an option. Any number of mechanical actuators may be used including, for example, a stepper motor, moveable stage, piezoelectric element, or solenoid. The translation stage 30 may also be manually-operated stage. Preferably, the translation stage 30 can move in sub-micron increments thereby permitting images to be taken of the sample 12 at slight x and y displacements.

In still another alternative embodiment, rather than move the optical fiber 18 in the x and y directions, a plurality of spaced apart illumination sources (e.g., an array of light sources 14 not shown) can be selectively actuated to achieve the same result without having to physically move the optical fiber 18 or color image sensor 24. The small discrete shifts (either by movement or actuation of spatially separated light sources 14) parallel to the color image sensor 24 are used to generate a pixel super-resolution hologram image that includes the channels of the CFA 28. For a Bayer CFA 28 which four channels, the pixel super-resolution hologram includes the four Bayer channels of B (Blue), G1 (Green 1), G2 (Green 2), and R (Red). In addition to movement in the x and y directions, the translation stage 30 may also move the sample holder 20 and/or color image sensor 24 in the z direction (i.e., orthogonal to x, y plane) so that images may be obtain at multiple heights. This enables multi-height phase recovery as described in more detail below.

Figure 1B:
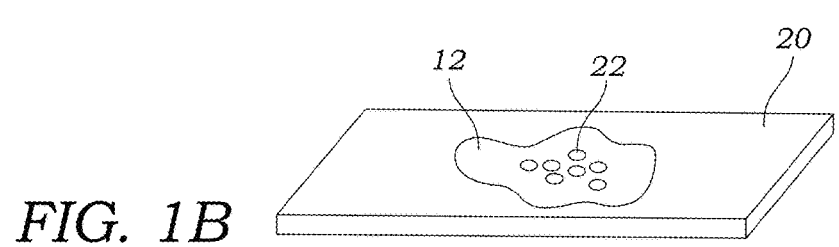
FIG. 1B illustrates a sample holder or substrate that contains a sample disposed thereon. The sample holder may be formed from an optically transparent substrate (e.g., glass or plastic).
Figure 1C:
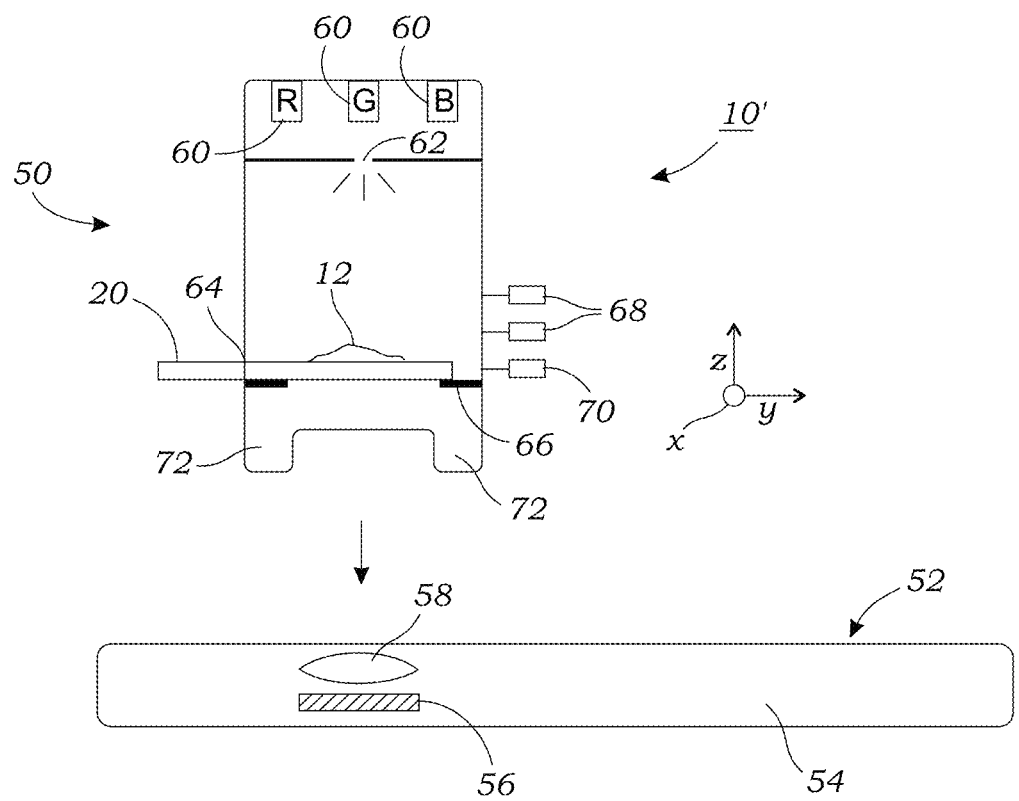
FIG. 1C illustrates an alternative lens-free microscope system to the bench or desktop embodiment of FIG. 1A. This embodiment uses a modular attachment that can be secured to a portable electronic device such as a mobile phone (e.g., Smartphone). Images are acquired using the native color image sensor of the mobile phone.
Figure 1D:
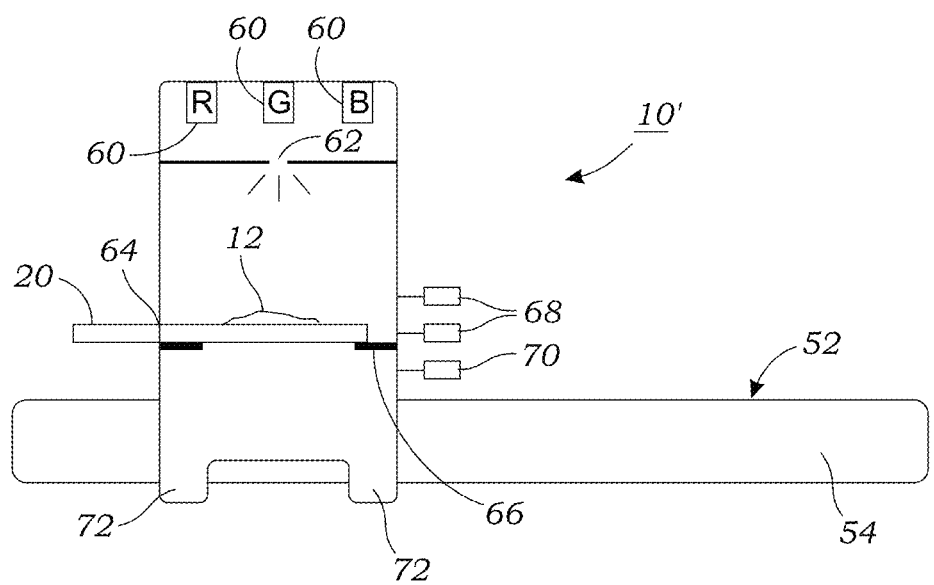
FIG. 1D illustrates the embodiment of FIG. 1C with the modular attachment being secured to the mobile phone.

FIGS. 1C and 1D illustrate an alternative embodiment of the microscope system 10'. In this embodiment, rather than have a benchtop or desktop lens-free microscope system 10 as illustrated in FIG. 1A, the same functionality may be incorporated into a lens-free based modular attachment 50 that is used in conjunction with a portable electronic device 52 such as a mobile phone. Other portable electronic devices 52 include tablets computing devices, webcams, laptops, and the like. The mobile phone 52 may include, for example, a Smartphone. Any number of makes and models of the mobile phone 52 may be used with the system 10' and methods described herein. The mobile phone 52 includes housing 54 that contains a color image sensor 56 (FIG. 1C) that is used to provide camera functionality for the mobile phone 52. The color image sensor 56, like color image sensor 24 in FIG. 1A, includes a CFA 28. The mobile phone 52 further includes an internal lens 58 (FIG. 1C) that is disposed within the housing 54 of the mobile phone 52.

As seen in FIGS. 1C and 1D, the lens-free modular attachment 50 includes a plurality of partially coherent light sources 60 which emit light at different colors or wavelengths. Illustrated in FIGS. 1C and 1D includes a red (R) light source 60, a green (G) light source 60, and a blue (B) light source 60. The light sources 60 may include one or more LEDs or laser diodes. The modular attachment 50 includes an aperture 62 or its equivalent for spatial filtering, and a slot 64, tray, receptacle or the like that can receive the sample holder 20 containing the sample 12 so as to place the sample 12 in an optical path formed between the light sources 60 and the color image sensor 56. The lens-free modular attachment 50 also includes a translation stage 66 which allows for movements in the x, y, and z directions to obtain a pixel super-resolution image as described herein. Knobs 68 may be used to move the sample holder 20 in the x and y directions while knob 70 may be used to move the sample holder 20 in the z direction. Images may be transferred to a computer 32 such as that illustrated in FIG. 1A using a wired or wireless connection. For example, the mobile phone 52 may contain software or an application (i.e., "app") that is used to acquire the lower resolution lens-free images which can then be offloaded or transferred to the computer 32 for further processing. The lens-free based modular attachment 50 may also include mechanical grips, tabs, clips 72 or the like to secure the same to the phone as seen in FIG. 1D.

Figure 3A:
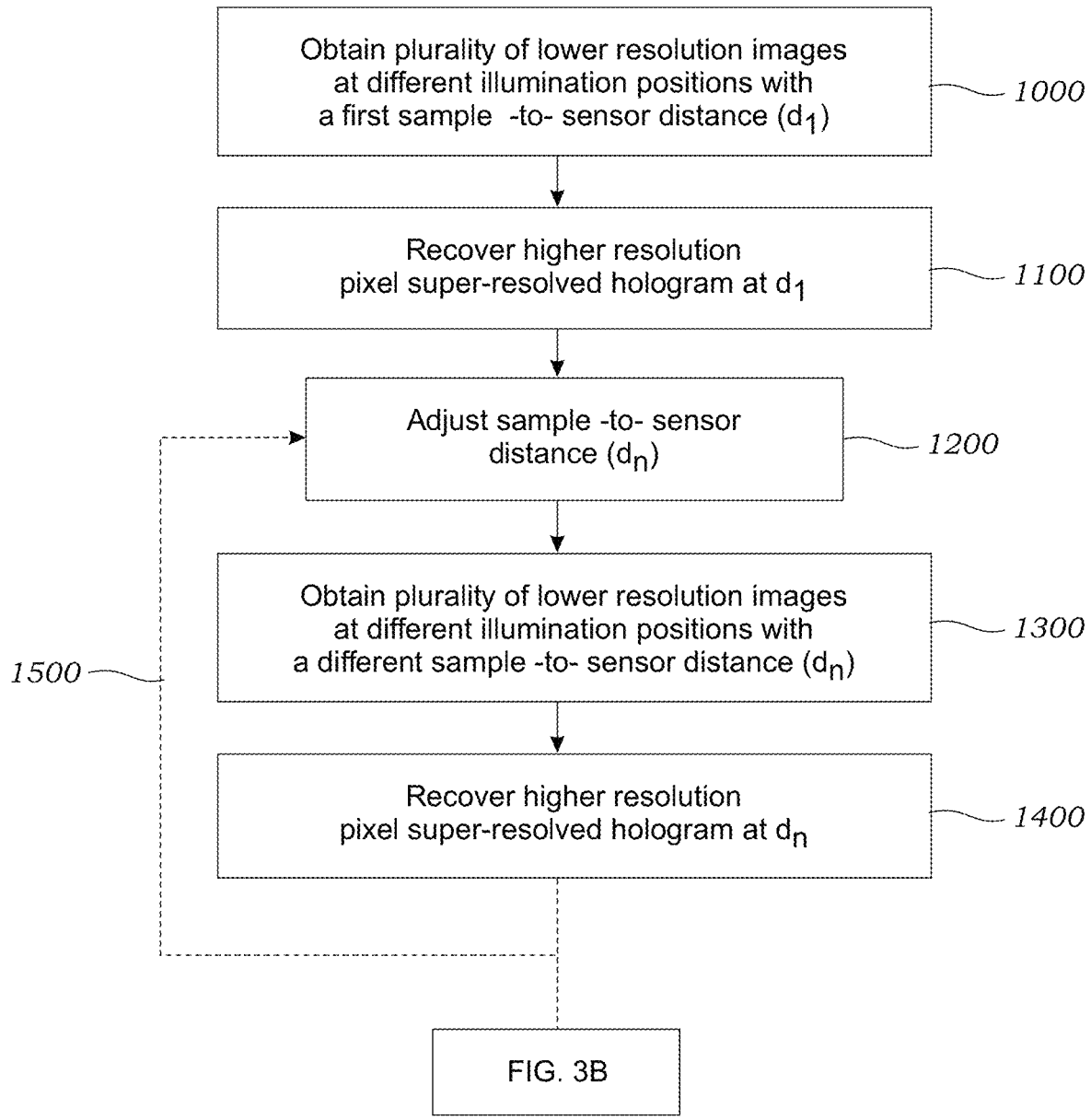
FIGS. 3A and 3B illustrate one method used to reconstruct phase and amplitude images of a sample according to one embodiment.

In the pixel super-resolution image process, a plurality of lower resolution images are taken at different positions and are used to generate a computational image reconstruction that has high resolution. As seen in FIG. 3A, in step 1000, a plurality of lower resolution images are obtained of the sample 12 while the illumination source(s) 14, sample holder 20, and/or the color image sensor 24 are moved relative to another at a plurality of different locations (e.g., x, y locations) to create the sub-pixel image shifts. The number of lower resolution images may vary but generally includes between about 2 and 250 images. During step 1000, the sample 12 is located from the image sensor 24 at a first distance ($d_1$). Next, as seen in step 1100, a pixel super-resolved (PSR) hologram is synthesized based upon the plurality of lower resolution images obtained in operation 1000. The details of digitally converting a plurality of lower resolution images into a single, higher resolution pixel super-resolved hologram image may be found in Bishara et al., Lensfree on-chip microscopy over a wide field-of-view using pixel super-resolution, *Optics Express* 18:11181-11191 (2010) and Greenbaum et al., Imaging without lenses: achievements and remaining challenges of wide-field on-chip microscopy, Nat. Methods 9, 889-895 (2012), which are incorporated herein by reference. This pixel super-resolution step takes lower resolution holographic shadows of the object(s) 22 contained within the sample 12 (e.g., captured at ~10 million pixels each) and then creates a higher resolution lens-free hologram that now contains>300 million pixels over the same 30 mm² field-of-view with an effective pixel size of ~300 nm.

Next, as seen in operation 1200, the distance between the sample 12 and the color image sensor 24 is adjusted to a different distance ($d_n$) (e.g., by adjusting z distance using translation stage 30). At this new distance ($d_n$), as seen in operation 1300, a plurality of lower resolution images are obtained of the sample 12 containing the object(s) 22 while the illumination source(s) 14, sample holder 20, and/or the color image sensor 24 are moved relative to another at a plurality of different locations (e.g., x, y locations) to create the sub-pixel image shifts. The plurality of lower resolution hologram images are obtained while the sample 12 and the color image sensor 24 are located at the new or different distance ($d_n$). After the lower resolution images are obtained, as seen in operation 1400, a pixel super-resolved hologram (at the different distance ($d_n$)) is synthesized based upon the plurality of lower resolution images obtained in operation 1300. As seen by arrow 1500, process is repeated for different sample-to-sensor differences. Generally, the process repeats such that a pixel super-resolved hologram is created at between 2-20 different distances although this number may vary. For example, in experiments described herein, four (4) such heights were used for the D-PSR method. Alternatively, the lower resolution images are all obtained at different distances and then for each distance, the higher resolution pixel super-resolved holograms are then recovered.

Figure 3B:
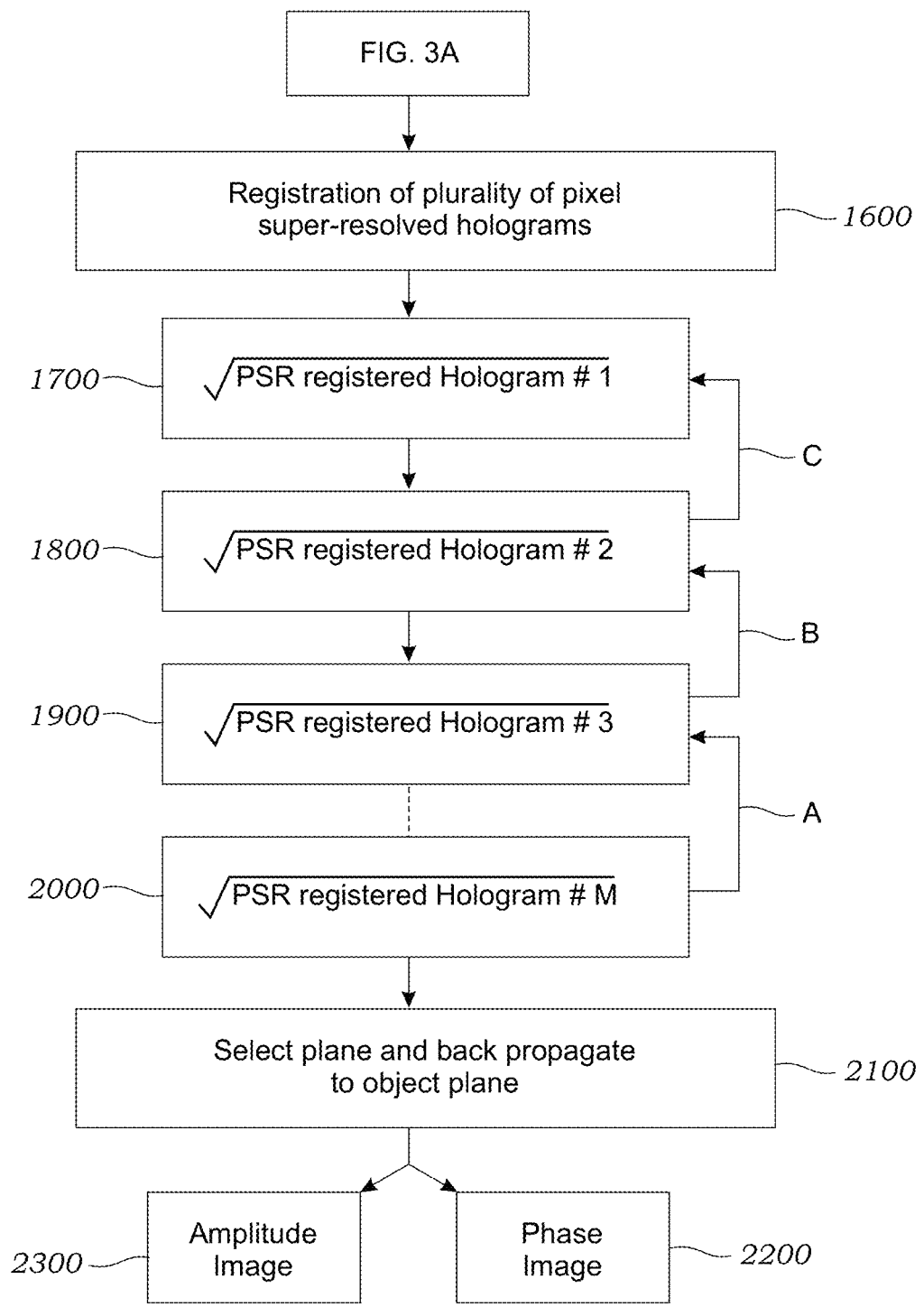

Now referring to FIG. 3B, the plurality of pixel super-resolved holograms obtained at the different heights (i.e., different z distances) are then registered with respect to each other as seen in operation 1600. The subsequent iterative phase recovery requires that these pixel super-resolved holograms are accurately registered to each other. During the image acquisition step, lateral translation and rotation of the objects between holograms of different heights are unavoidable. To accurately register these pixel super-resolved holograms to each other, three-control points from three different corners of the image are selected in one of the holograms (which is deemed the reference hologram). One preferred control point could be a small isolated dust particle at a corner since its hologram is circularly symmetric. If need be, a special alignment marker(s) can also be placed at the corners of the sample holder/substrate. Therefore, normalized correlations between lens-free holograms can be used to find the matching points in each image captured at a different height. After selection of the control points, a small area (e.g., ~30×30 μm) around each control point is cropped and digitally interpolated (~4-6 times) to serve as a normalized correlation template. Furthermore, for accurately finding the coordinate shift of each control point among M images, lens-free holographic images have to be positioned in the same $z_2$-distance. Therefore, the difference in the $z_2$-distance between lens-free holograms acquired at different heights is evaluated by an auto-focus algorithm, such as that disclosed in J. L. Pech-Pacheco et al., "Diatom Autofocusing in Brightfield Microscopy: a Comparative Study," in *Pattern Recognition, International Conference On* (IEEE Computer Society, 2000), Vol. 3, p. 3318, incorporated herein by reference, which permits one to digitally propagate the selected correlation templates to the same $z_2$-distance, where normalized correlations are calculated to find the coordinate shifts between the control points in each image. An affine transformation is used to register the super-resolved holograms of different heights to the reference hologram.

Still referring to FIG. 3B, operations 1700, 1800, 1900, and 2000 illustrate one embodiment of the iterative phase recovery process that is used to recover the lost optical phase. Additional details regarding the iterative phase recovery process may be found in L. J. Allen and M. P. Oxley, Optics Communications, 2001, 199, 65-75, which is incorporated herein by reference. The square roots of these resulting M registered holograms are then used as amplitude constraints in the iterative phase recovery algorithm that is steps 1700 through 2000. At the beginning of the algorithm, as seen in operation 1700, in one embodiment, the initial phase is assumed to be zero, after which the iterative phase recovery algorithm uses the free space propagation function to digitally propagate back and forth among these multiple heights. At each height, the amplitude constraint (i.e., the measurement) is enforced while the phase is kept from the previous digital propagation step.

To initiate the phase recovery process, a zero-phase is assigned to the object intensity measurement. One iteration during this phase-recovery process can be described as follows: Intensity measurement #1 (step 1700) is forward propagated (with zero initial phase) to the plane of intensity measurement #2 (step 1800). Then, the amplitude constraint in measurement #2 (step 1800) is enforced while the calculated phase resulting from forward propagation remains unchanged. The resulting complex field is then forward propagated to the plane of intensity measurement #3 (step 1900), where once again the amplitude constraint in measurement #3 is enforced while the calculated phase resulting from forward propagation remains unchanged. This process continues until reaching the plane of intensity measurement #M (step 2000). Then instead of forward propagating the fields of the previous stages, back propagation is used as seen by respective arrows A, B, and C. The complex field of plane #M (step 2000) is back propagated to the plane of intensity measurement #M−1. Then, the amplitude constraint in measurement #M−1 is enforced while the resulting phase remains unchanged. The same iteration continues until one reaches the plane of intensity measurement #1 (step 1700). When one complete iteration is achieved (by reaching back to the plane of intensity measurement #1), the complex field that is derived in the last step will serve as the input to the next iteration. Typically, between 1-1,000 iterations and more typically between 1-70 iterations are required for satisfactory results (more typically between 20-30 iterations). After the phase recovery iterations are complete, as seen in operation 2100, the acquired complex field of any one of the measurement planes is selected and is back propagated to the object plane to retrieve both phase image 2200 and amplitude image 2300 of the sample 12.

As explained further herein, multi-height phase recovery may be incorporated by utilizing the solution to the transport of intensity equation (TIE) to obtain the initial guess of the lost phase as well as tilt correction. Details regarding the use of TIE to generate the initial phase guess to multi-height based iterative phase retrieval as well as tilt correction may be found in U.S. Patent Application Publication No. 2017-0220000, which is incorporated by reference herein.

Figure 4:
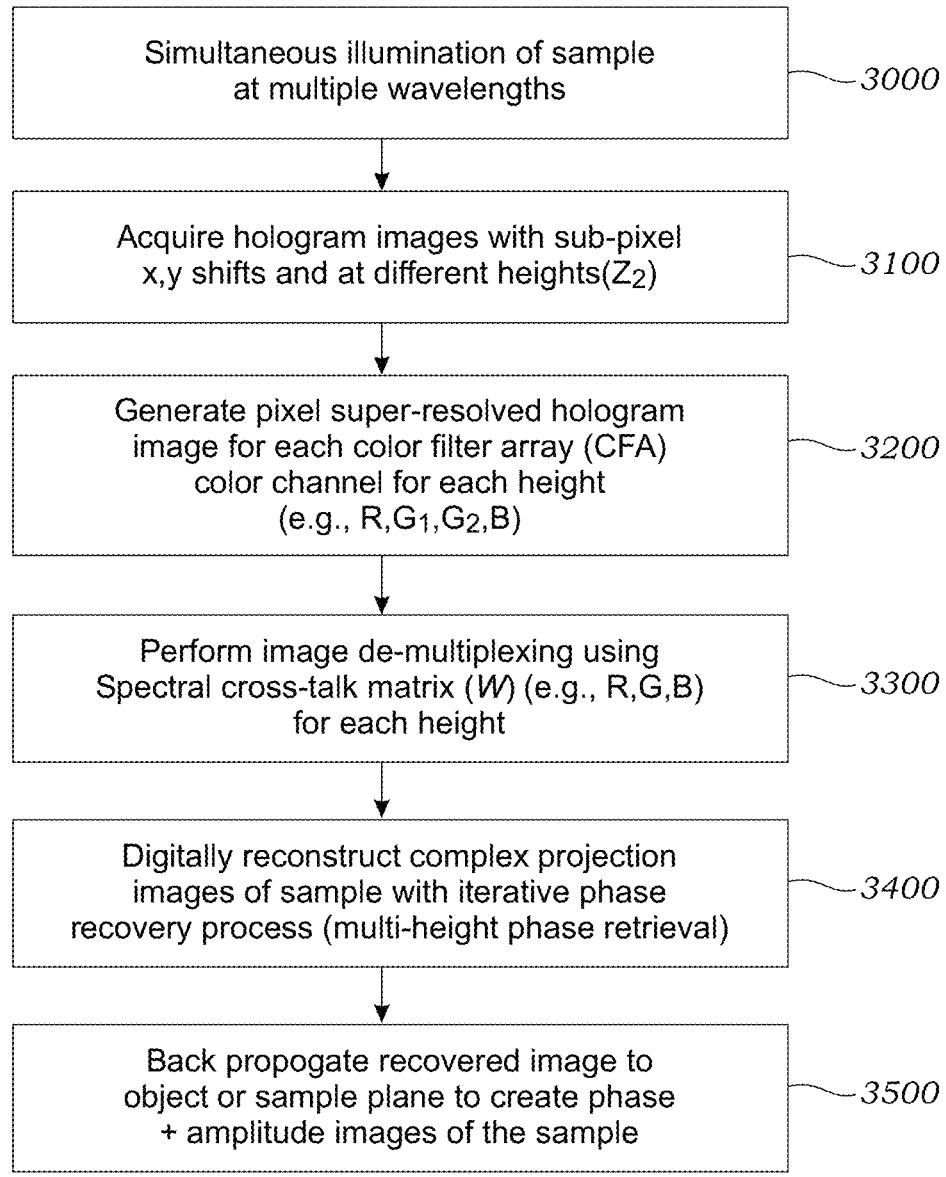
FIG. 4 illustrates a flowchart or diagram illustrating the flow of operations that are used to generate the final color image of a sample using simultaneous illumination according to one embodiment.
Figure 5:
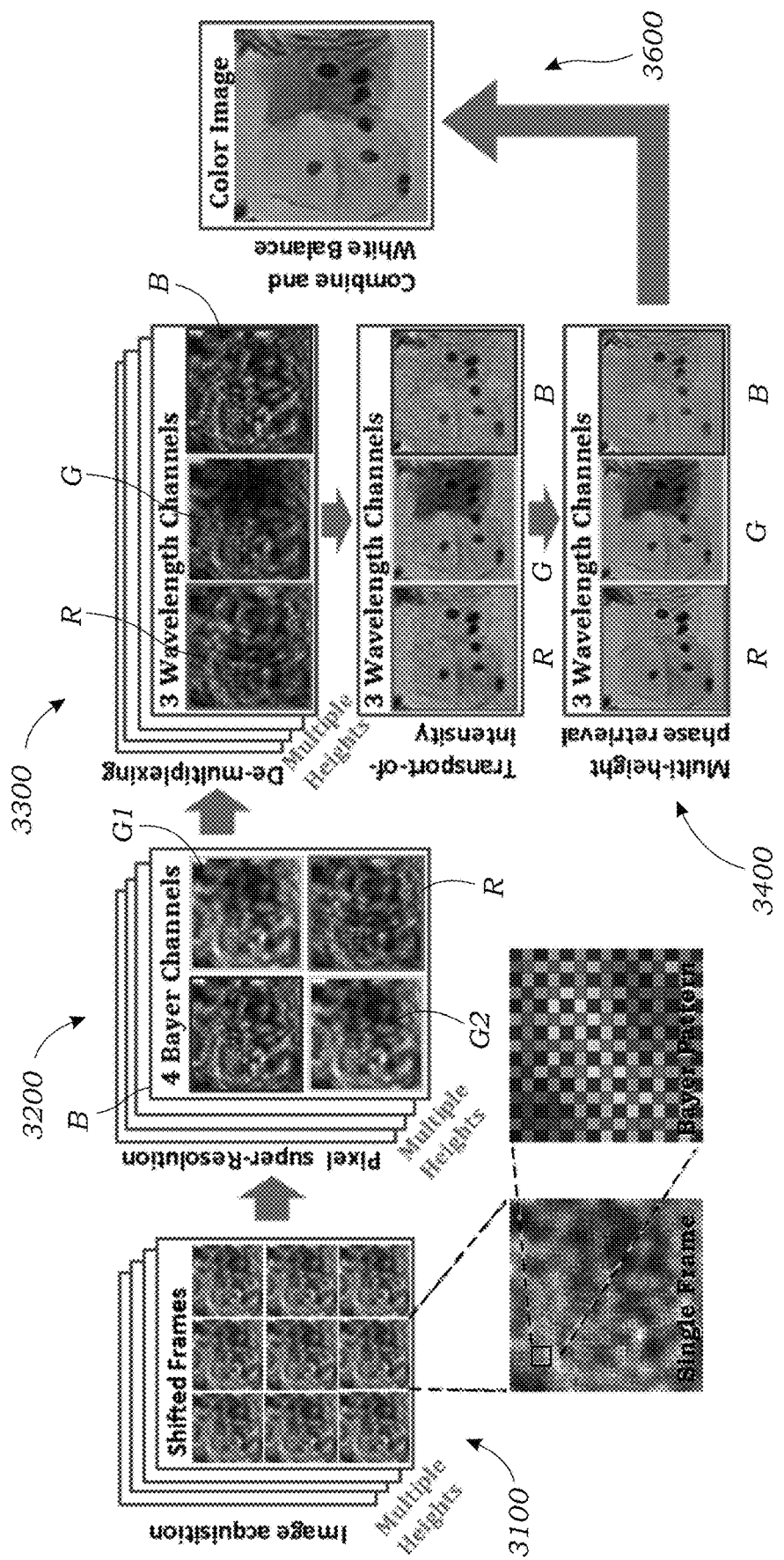
FIG. 5 illustrates another flowchart or diagram illustrating the flow of operations that are used to generate the final color image of a sample using simultaneous illumination.

FIGS. 4 and 5 illustrate a flowchart or diagram illustrating the flow of operations according to one embodiment. With reference to FIG. 4, the process starts in operation 3000 where the sample 12 is illuminated simultaneously by the illumination source(s) 14, 60 with multiple colors or wavelengths. The color image sensor 24 is used to acquire hologram images with sub-pixel x, y shifts at different heights as seen by operation 3100 in FIG. 4. FIG. 5 illustrates, for example, nine (9) sub-pixel shifted frames that have been captured by the illumination source(s) 14 at a single height (different numbers may be used). These sub-pixel images are obtained at a plurality of different heights. Referring back to FIG. 4, in operation 3200, a pixel super-resolved hologram is generated for each color channel of the CFA for each height. FIG. 5, for example, illustrates a four channel image (R, G1, G2, B) being generated for a Bayer CFA 28. Next, as seen in operation 3300 of FIG. 4, image de-multiplexing of the pixel super-resolved holograms is performed using the spectral cross-talk matrix (W) for each height. FIG. 5 illustrates the four channel (R, G1, G2, B) pixel super-resolution image that is de-multiplexed into three channels (R, G, B). Referring back to FIG. 4, next in operation 3400, a multi-height phase retrieval process is performed to digitally reconstruct complex projection images of the sample with the iterative phase recovery process. This process is also illustrated in FIG. 5 with the TIE being used for the initial guess. As seen in FIG. 4, in operation 3500, a recovered image is then back propagated to the object or sample plane to create phase and amplitude images of the sample. FIG. 5 illustrates the recovered images for the R, G, and B channels. These different channels can then be combined in operation 3600 (FIG. 5) with white balancing to produce the final demosaiced pixel super-resolution (D-PSR) color image as seen in FIG. 5.

Referring back to FIG. 1A, the microscope system 10 includes a computer 32 such as a server, laptop, desktop, tablet computer, portable communication device (e.g., Smartphone), personal digital assistant (PDA) or the like that is operatively connected to the microscope system 10 such that lower resolution images (e.g., lower resolution or raw image frames) are transferred from the color image sensor 24 to the computer 32 for data acquisition and image processing. The computer 32 includes one or more processors 34 that, as described herein in more detail, runs or executes image processing software 36 that takes multiple, sub-pixel (low resolution) images taken at different scan positions (e.g., x and y positions as seen in inset of FIG. 1A) and creates a high resolution projection hologram image of the objects 22 in the sample 12 for each color channel (e.g., R, G1, G2, B). The software 36 creates additional high resolution projection hologram images of the objects 22 at each different $z_2$ distance. The multiple, high resolution image "stacks" that are obtained at different heights are registered with respect to one another using the software 36.

As explained herein, the software 36 takes the multi-channel color pixel super-resolution images and then subjects the images to image de-multiplexing. In image de-multiplexing, the transmission spectra of the CFA 28 typically has considerable cross-talk among the color channels. For example, for a Bayer CFA 28, for each pixel of the color image sensor 24, one can formulate this spectral cross-talk as a matrix (W), such that:

$$\begin{bmatrix} M_B \\ M_{G1} \\ M_{G2} \\ M_R \end{bmatrix} = W \cdot \begin{bmatrix} 1_B \\ 1_G \\ 1_R \end{bmatrix} = \begin{bmatrix} w_{11} & w_{12} & w_{13} \\ w_{21} & w_{22} & w_{23} \\ w_{31} & w_{32} & w_{33} \\ w_{41} & w_{42} & w_{43} \end{bmatrix} \cdot \begin{bmatrix} 1_B \\ 1_G \\ 1_R \end{bmatrix} \quad (1)$$

where $M_B$, $M_{G1}$, $M_{G2}$, and $M_R$ correspond to the pixel super-resolved intensity values for each channel (i.e., the output of the previous sub-section), and $I_B$, $I_G$, and $I_R$ refer to the de-multiplexed holograms corresponding to the three illumination wavelengths, before the spectral mixing occurred at the color image sensor 24. The entries of the cross-talk matrix W are determined by the transmission spectra of the Bayer CFA 28. These may be provided by the manufacturer of the color image sensor 24 or experimentally determined. Importantly, for a given color image sensor 24, the spectral cross-talk calibration curves need only be measured once.

Based on the spectral cross-talk matrix, the de-multiplexed holograms corresponding to the three simultaneous illumination wavelengths (i.e., R, G, B) in the microscope system 10 can then be determined through a left inverse operation:

$$\begin{bmatrix} I_B \\ I_G \\ I_R \end{bmatrix} \approx (W^T W)^{-1} W^T \begin{bmatrix} M_B \\ M_{G1} \\ M_{G2} \\ M_R \end{bmatrix} \quad (2)$$

where the superscript −1 refers to the inverse and T refers to the transpose of a matrix. Post de-multiplexing, as seen in FIGS. 4 and 5, there exists de-multiplexed, pixel super-resolved images for the three color channels R, G, B at a given height. A plurality of these de-multiplexed images is generated for the multiple heights (i.e., $z_2$ distances) where images have been obtained. The software 36 then digitally reconstructs complex projection images of the sample 12 and/or objects 22 through an iterative phase recovery process that rapidly merges all the captured holographic information to recover lost optical phase of each lens-free hologram without the need for any spatial masking, filtering, or prior assumptions regarding the samples. After a number of iterations (typically between 1 and 75), the phase of each lens-free hologram (captured at different heights) is recovered and one of the pixel super-resolved holograms is back propagated to the object plane to create phase and amplitude images of the sample 12 including objects 22 contained therein.

The computer 32 may be associated with or contain a display 38 or the like that can be used to display color images that are generated in accordance with the methods described herein. The user may, for example, interface with the computer 32 via an input device 40 such as a keyboard or mouse to select different software functions using a graphical user interface (GUI) or the like. It should be noted that the method described herein may also be executed in a cloud-based processing operations. Image data could be sent to a remote computer 32 (e.g., remote server) for processing with a final image being generated remotely and sent back to the user on a separate computer 32 or other electronic device (e.g., mobile phone display) for ultimate display and viewing. Image and other data may be transferred over a wide area network such as the Internet or a proprietary communication network (like those used for mobile devices).

Experimental

Experiments were performed to demonstrate that pixel super-resolution can be merged into the color de-multiplexing process to significantly suppress the artifacts in wavelength-multiplexed holographic color imaging where multiple wavelengths (e.g., three) simultaneously illuminate a sample. This new D-PSR approach generates color images that are similar in performance to sequential illumination at three wavelengths, and therefore improves the speed of holographic color imaging by 3-fold. D-PSR method is broadly applicable to holographic microscopy applications, where high-resolution imaging and multi-wavelength illumination are desired.

Optical Setup and Data Acquisition

With reference to FIGS. 1A and 1B, an in-line holographic lens-free on-chip imaging geometry was used. A broadband source (WhiteLase-Micro; Fianium Ltd, Southampton, UK) is filtered by an acousto-optic tunable filter down to ~5 nm bandwidth and is coupled to a single mode fiber to generate partially-coherent illumination across the field-of-view (~20 mm$^2$) of the lens-free imaging setup. This source can simultaneously output up to eight (8) wavelength channels into the same fiber optic cable, and three spectral bands were used in the experiments (i.e., ~470 nm, ~530 nm, ~625-630 nm) to create multi-color illumination. This multiplexed partially coherent light, coming out of the fiber optic cable, propagates ~6 cm, and impinges on the specimen plane. Note that in other commercial or practical embodiments, the light source may include multiple different light sources as explained herein that emit light at a particular wavelength or narrow band of wavelengths. The sources may include, for example, LEDs or laser diodes. With respect to the experimental results generated herein, each of the three wavelength channels is partially diffracted by the sample and generates three independent in-line holograms to be sampled by a Bayer color CMOS image sensor chip (16.4 Mpixel, 1.12 μm pixel size, Sony Corp., Japan), which is placed ~0.4 mm below the sample plane. The pixels of this color CMOS image sensor chip have four channels, namely B (Blue), G1 (Green 1), G2 (Green 2), and R (Red), which form a 2×2 period of the Bayer pattern on the image sensor chip (see FIG. 2). These filters have different transmission spectra, which will be detailed later on, and this information is crucial for spectral de-multiplexing of the acquired holograms. The color CMOS image sensor chip is also mounted on a computer controlled 3D motion stage to permit: (1) lateral sub-pixel shifts between the color image sensor and the sample hologram (x, y direction) which is used to generate pixel super-resolved holograms, and (2) axial modulation (z direction) of the sample-to-sensor distance which is used for multi-height based phase retrieval (i.e., twin-image elimination). The entire data acquisition process is automated by a custom-developed LabVIEW program.

Pixel Super-Resolution

Pixel super-resolution is a technique that deals with the spatial under-sampling problem in an imaging system, in which a series of sub-pixel shifted low resolution images are acquired to digitally synthesize a high resolution image of the object, significantly increasing the space-bandwidth product of the imaging system. In these experiments, to achieve pixel super-resolution, the stage was programmed to move the image sensor laterally on a 6×6 grid and at each grid point a low-resolution raw hologram is captured. Each recorded raw hologram intensity is then separated into four Bayer channels (namely B, G1, G2, and R) and for each one of these channels, a conjugate gradient based pixel super-resolution method was used to synthesize a super-resolved hologram with an effective pixel size of ~0.33 μm at each sample-to-sensor height. The spatial location of each channel with respect to the others is also taken into account and digitally corrected for; therefore this pixel-super resolution step enables all the Bayer channels (B, G1, G2 and R) to be virtually super-imposed onto each other, which is important to mitigate the artifacts in the subsequent demosaicing steps.

De-Multiplexing of Pixel Super-Resolved Holograms

The transmission spectra of the four Bayer channels on a color CMOS image sensor contain considerable color cross-talk among channels (see FIG. 6A). For each pixel of the image sensor chip, this spectral cross-talk can be formulated as a matrix (W), as described by Equation 1 herein. The entries of the cross-talk matrix W are determined by the transmission spectra of the Bayer CFA. Although the transmission spectrum of each Bayer filter is usually provided by the manufacturer of the sensor-array, here it was experimentally calibrated to get more accurate results. For this purpose, the background (i.e., object-free) response of the color image sensor was first recorded from 400 nm to 700 nm at 5 nm steps.

A 400-by-400 pixel region at the center of the sensor chip was averaged for each channel, and after normalization of the illumination power at each wavelength, measured using a power-meter (Thorlabs PM100, S120UV sensor head), the resulting curve for each channel is then taken as the spectral response of each Bayer filter on the image sensor chip (see e.g., FIG. 6A). It should be emphasized that for a given color image sensor, these spectral cross-talk calibration curves need to be measured only once. Based on these measured spectra, the cross-talk matrix (W in Eq. (1)) can be inferred for any arbitrary set/choice of illumination wavelengths that are multiplexed in the holographic color imaging experiments (see e.g., Table 1).

TABLE 1

Calibrated cross-talk matrix of the CMOS image sensor chip (Sony IMX81) at two sets of multiplexed wavelengths.

| $\lambda_B, \lambda_G, \lambda_R$ | 470 nm, 527 nm, 624 nm | 471 nm, 532 nm, 633 nm |
|---|---|---|
| W | $\begin{bmatrix} 1.0000 & 0.1722 & 0.0566 \\ 0.2903 & 1.0000 & 0.2174 \\ 0.2873 & 1.0003 & 0.2030 \\ 0.0307 & 0.1349 & 1.0000 \end{bmatrix}$ | $\begin{bmatrix} 1.0000 & 0.1593 & 0.0650 \\ 0.3340 & 1.0000 & 0.2062 \\ 0.3353 & 1.0055 & 0.1936 \\ 0.0335 & 0.1345 & 1.0000 \end{bmatrix}$ |

Based on this spectral cross-talk matrix, the de-multiplexed holograms corresponding to the three simultaneous illumination wavelengths in the holographic imaging set-up can then be determined through a left inverse operation using Equation 2 above.

Multi-Height Based Phase Retrieval

One drawback of in-line holographic imaging geometry is its twin image noise. Additional constraints, such as the object support, sparsity or multiple measurements at different heights or illumination angles can be employed to eliminate the twin image noise. For spatially dense and connected objects a multi-height based phase retrieval method is usually used because it is relatively hard to define an object support for such connected samples. In this multi-height based iterative phase retrieval algorithm, one starts from one of the pixel super-resolved hologram and digitally propagates it to the next measurement height, where the amplitude of the field is replaced with the measured amplitude, and then propagates it to the next height until one reaches the last measurement plane (z). The same process is repeated backward and then forward for e.g., 20-30 iterations. Each wave propagation operation is done using the angular spectrum method. For faster convergence, optionally, one can use the solution to the transport-of-intensity equation (TIE) as the initial phase guess for multi-height phase retrieval. In the experiments reported herein, holograms were measured at four (4) consecutive heights that are axially separated by ~30 µm.

Saturation Correction in Digitization of Wavelength-Multiplexed Holograms

When using the D-PSR approach for imaging of biological samples, a saturation-related de-multiplexing color artifact can sometimes be observed, as also illustrated in FIGS. 7A-7H. Although pixel saturation can be avoided by reducing the exposure time to a point where no pixels are saturated, this will result in unacceptable loss of information, as most of the pixels will then use only a small portion of the dynamic range. Alternatively, here a Bayesian-estimation-based saturation correction algorithm is used, which uses the unsaturated pixels from other color channels at the same physical location to get a better estimate of the saturated pixels. It is theoretically proven that, using this Bayesian estimation approach, the corrected image will always have a smaller error than the uncorrected saturated one.

Details regarding the use of this saturation correction method in the D-PSR approach are presented below. It is assumed that for a given raw image, the pixel values of different color channels follow a normal distribution:

$$\begin{pmatrix} X_s \\ X_k \end{pmatrix} \sim N\left[\begin{pmatrix} \mu_s \\ \mu_k \end{pmatrix}, \begin{pmatrix} s_{ss} & s_{sk} \\ s_{ks} & s_{kk} \end{pmatrix}\right] \quad (3)$$

where $X_s$ and $X_k$ denote pixel values of saturated and unsaturated channels, $\mu_s$ and $\mu_k$ represent their mean, respectively, and $S_{ss}$, $S_{sk}$, $S_{ks}$ and $S_{kk}$ represent their covariance. The saturated channel $X_s$ can be replaced by its statistical expectation, using the known non-saturated channel measurements $X_k=k$ at the same pixel location:

$$E(X_s \mid X_k = k, \ X_s \geq s) = \mu_{xs} + \frac{1}{z}\left(\frac{S_{xs}}{2\pi}\right)^{\frac{1}{2}} \exp\left[-\frac{(s-\mu_{xs})^2}{2S_{xs}}\right] \quad (4)$$

where:

$$Z = \frac{1}{\sqrt{2\pi S_{xs}}} \int_{s-\mu_{xs}}^{\infty} \exp\left(-\frac{x^2}{2S_{xs}}\right) dx \quad (5)$$

$$\mu_{xs} = \mu_s + S_{sk} S_{kk}^{-1}(k - \mu_k) \quad (6)$$

$$S_{xs} = S_{ss} - S_{sk} S_{kk}^{-1} S_{sk}^T \quad (7)$$

Figure 8:
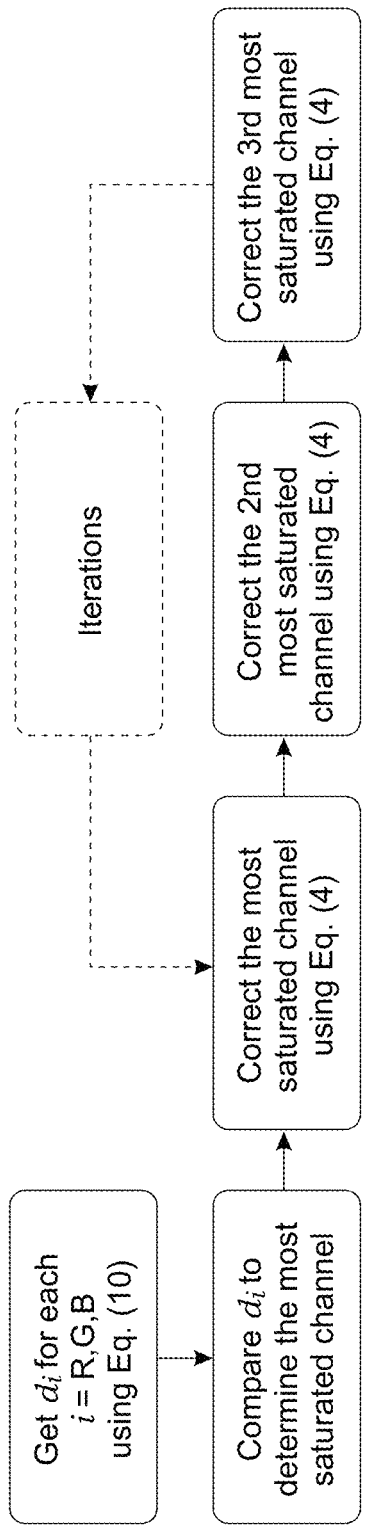
FIG. 8 illustrates a flow chart for the saturation correction steps or operations used in the D-PSR approach according to one embodiment.

Note that since the spectral response of G1 and G2 channels are nearly identical, the average is taken of these two super-resolved channels and it is treated as the same channel G—only for this saturation correction step. The saturation correction algorithm (see FIG. 8) is then implanted in five steps, as follows:

Step 1. Estimate the a-priori mean $\hat{\mu}$ and co-variance $\hat{S}$ of the unsaturated pixel values of R, G and B channels:

$$\hat{\mu} = \begin{pmatrix} \hat{\mu}_R \\ \hat{\mu}_G \\ \hat{\mu}_B \end{pmatrix} = \frac{1}{n} \cdot \sum_{j}^{n} x_j \quad (8)$$

$$\hat{S} = \begin{pmatrix} \hat{S}_{RR} & \hat{S}_{RG} & \hat{S}_{RB} \\ \hat{S}_{GR} & \hat{S}_{GG} & \hat{S}_{GB} \\ \hat{S}_{BR} & \hat{S}_{BG} & \hat{S}_{BB} \end{pmatrix} = \frac{1}{n-1} \cdot \sum_{j}^{n} (x_j - \hat{\mu})(x_j - \hat{\mu})^T \quad (9)$$

where n is the total number of un-saturated pixels in the image, $x_j=(x_j^R, x_j^G, x_j^B)^T$ is a vector that represents the pixel values of R, G, B channels at pixel location j.

Step 2. After defining a saturation level s, the distance $d_i$ of all the channels (i=R, G, B) can be determined as:

$$d_i = \frac{s - \hat{\mu}_i}{\sqrt{v_i}}, \text{ for } i = R, G, B \quad (10)$$

where $\hat{\mu}_i$ and $v_i$ define the mean and the variance of all the unsaturated pixels in color channel i, respectively. Here, s=1020 was chosen for the 10 bit depth image sensor.

Step 3. Start from the most saturated channel, i.e. the channel i (i=R, G or B) that has the smallest distance $d_i$ to the saturation level, and replace the values of its saturated pixels with the expectation value calculated using Eq. (4). All the pixels in the other two un-corrected channels are taken as valid pixels.

Step 4. Correct the second most saturated channel i using Eq. (4), taking the corrected most saturated channel and the other un-corrected channel as valid pixels.

Step 5. Correct the third (last) saturated channel using Eq. (4), taking the corrected values of the first and the second most saturated channels as valid pixels.

Steps 3-5 are typically run iteratively (e.g., for 3 iterations) to get improved results. As illustrated in FIGS. 7A-7H, the de-multiplexing color artifacts shown in the first column (FIGS. 7A and 7E) are greatly alleviated with this additional saturation correction step (second column—FIGS. 7B and 7F), resulting in a reconstructed color image that is similar to a sequentially taken RGB image (third column—FIGS. 7C and 7G).

White-Balancing of Wavelength-Multiplexed Holograms

Although the power levels of the multiplexed illumination wavelengths during the measurements are adjusted so that their detected intensities are very close to each other, there are still small uncontrolled variations among color channels. To correct for these power variations, a uniform background (empty) region of the captured hologram is first chosen and then one calculates the average of each Bayer channel within this selected region which is taken as the relative power level of each illumination wavelength. All the reconstructed holographic images are then normalized using these calculated power ratios to get a white-balanced image.

Optimization of the Choice of Illumination Wavelengths in D-PSR

Typically three illumination wavelengths are multiplexed in the D-PSR experiments, which are assigned to B, G and R channels, respectively. Here, the following question was also addressed: if one could arbitrarily choose these three illumination wavelengths, what would be the optimal wavelength range for each source to be multiplexed? Intuitively, the optimality of the selected wavelengths depends on the transmission spectra (i.e., wavelength cross-talk) of the color filters on the color image sensor chip, as well as the transmission characteristics of the specimen to be imaged. Since the aim here is for general purpose microscopic imaging, optimization of the illumination as a function of the sample spectral characteristics is not considered; and therefore only considered the transmission spectra of the CFA on the color image sensor.

If the multiplexed channels are chosen to be too close in wavelength, the cross-talk among them will be too strong, and the illumination power of one or more channels needs to be reduced to accommodate the finite bit-depth of the digital sensor, which in turn will cause loss of spatial information. To better understand how this de-multiplexing error varies according to the selection of the multiplexed illumination wavelengths, a brute-force search was conducted of all the possible wavelength combinations for the spectral range of 400 nm to 700 nm with 1 nm step size and the resulting de-multiplexing errors were compared. FIG. 9 illustrates a flow-chart of de-multiplexing error calculation for different combinations of multiplexed illumination wavelengths in D-PSR.

Figure 9A:
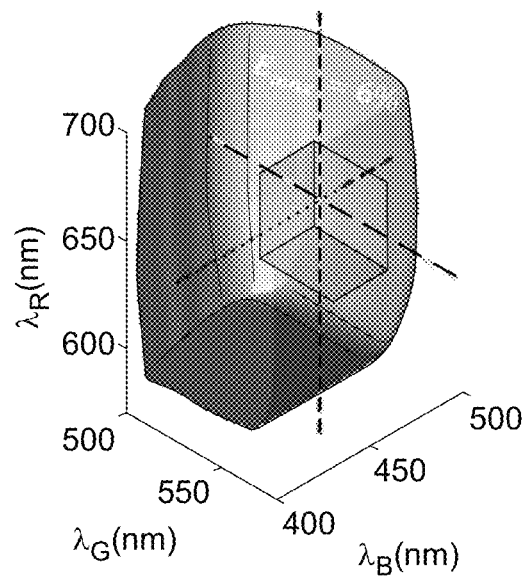
FIG. 9A illustrates the range of illumination wavelength combinations with a maximum de-multiplexing error of 6% (shown as the outer surface) spans more than ~50 nm for all three color channels. A typical selection of red (~610-650 nm), green (~520-560 nm) and blue (~450-480 nm) illumination wavelengths (shown with the inside cube) falls inside the 6% maximum error volume.
Figure 9B:
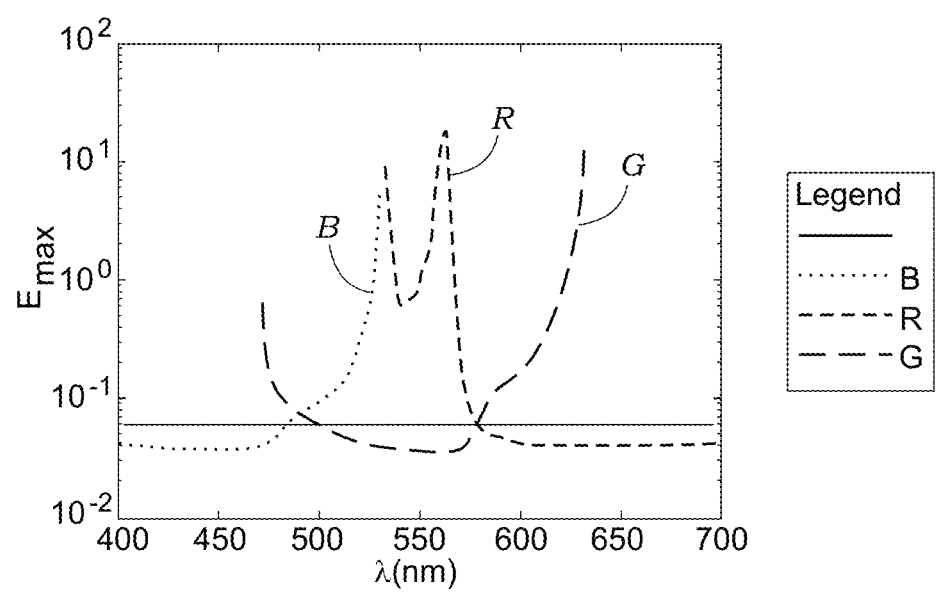
FIG. 9B illustrates one-dimensional (1D) cross sectional plots of the maximum de-multiplexing error, each of which passes through the point $(\lambda_B, \lambda_G, \lambda_R)=(471,532,633)$nm in FIG. 9A. The horizontal line indicates an error threshold of 6%.

FIG. 9A illustrates the range of illumination wavelength combinations with a maximum de-multiplexing error of 6% (shown as the outer surface) spans more than ~50 nm for all three color channels. A typical selection of red (~610-650 nm), green (~520-560 nm) and blue (~450-480 nm) illumination wavelengths (shown with the inner cube) falls inside the 6% maximum error volume. FIG. 9B illustrates 1D cross sectional plots of the maximum de-multiplexing error, each of which passes through the point $(\lambda_B, \lambda_G, \lambda_R)=(471,532,633)$nm in FIG. 9A. The dashed black line indicates an error threshold of 6%.

As illustrated in FIGS. 9A and 9B, the differences among the de-multiplexing errors for different wavelength combinations are smaller than 6% over a large spectral range (>50 nm), which also contains the typical choice of red (610-650 nm), green (520-560 nm) and blue (450-480 nm) illumination bands. Based on this, it was concluded that for a typical Bayer image sensor, like the image sensor used herein, the range of wavelength combinations that can be used for simultaneous illumination of the sample is rather large.

Results and Discussion

When the illumination wavelengths are multiplexed and simultaneously recorded, the resulting holograms using a Bayer image sensor chip, there will be mainly two types of artifacts generated: (1) the spectral cross-talk among different Bayer filters will create pixel level mixing of holographic information of different illumination wavelengths (see e.g. FIG. 6A); and (2) spatial demosaicing artifacts will be created because the Bayer mosaicing geometry has four (4) color channels (B, G1, G2, and R) that are spatially separated by one pixel shift, and requires the interpolation of neighboring pixels for the missing spatial information, which gives rise to fringe artifacts in holograms. Conventional demosaicing techniques employed in digital cameras and photography literature rarely suffer from these artifacts as most natural images are spatially smooth. However, when dealing with multi-color digital holographic microscopy, the recorded holograms contain rapid oscillations and fringes, and therefore using a conventional demosaicing approach will result in severe color artifacts.

The first problem listed above, i.e., the spectral cross-talk issue, can generate strong high-frequency artifacts if left uncorrected. Experimental examples of these artifacts are illustrated in the images of FIGS. 6B and 6C, where pixel super-resolved holographic image reconstructions are shown without de-multiplexing. These are to be compared against the de-multiplexed D-PSR results (FIGS. 6D and 6E), which show significant improvements especially in high-resolution features. As explained herein, this issue can be tackled by digital de-multiplexing (through Eq. (2)). However, if this de-multiplexing step is performed directly on demosaiced Bayer pixels (i.e., without pixel super-resolution), it will also generate color artifacts for holographic imaging at interpolated fringes (e.g., see FIG. 10A), and such fringe artifacts at the hologram plane will spread out to the whole reconstructed image and generate severe rainbow artifacts, as can be seen in FIGS. 10B, 10E. D-PSR results for the same samples (FIGS. 10C, 10F) show significant improvements and suppression of such color artifacts, in addition to having much better spatial resolution compared to interpolation based de-multiplexing results shown in FIGS. 10B, 10E.

Next, color-stained Papanicolaou smears (Pap smears) were imaged that are frequently used for screening of cervical cancer in order to compare the color imaging performance of D-PSR against some of the previously reported holographic color imaging techniques, including sequential RGB imaging and YUV color-space averaging. As illustrated in the experimental comparison that is provided in FIGS. 11A-11M, D-PSR has a very similar color imaging performance compared to sequential RGB imaging; however, by benefiting from simultaneous multi-wavelength illumination, D-PSR uses 3-fold less number of measurements compared to sequential color imaging, which makes it much more data efficient and faster. YUV color-space averaging, on the other hand, acquires a similar number of raw measurements/holograms compared to D-PSR, i.e., N+3 vs. N, respectively, where N is the number of raw measurements that D-PSR uses. However, the color imaging performance of YUV color-space averaging technique is inferior to D-PSR as it shows color bias and artifacts, also causing color leakage at the borders of rapid spatial transitions as illustrated in FIG. 11C, 11G, 11K. In the last column of images, namely, FIGS. 11E, 11I, and 11M, microscopic images of the same sample regions of interest taken using a 40×0.75NA objective-lens are also shown for comparison. Note that the lens-based microscope images are blurred in some regions because of the limited depth-of-focus compared to lens-free microscopy images. Furthermore, to emphasize the large FOV advantage of lens-free on-chip microscopy, typical FOVs of 40× and 20× objective-lenses are also shown in FIG. 11A.

It should also be noted that, in addition to 3-fold imaging speed improvement and reduced number of measurements compared to sequential color illumination, there are other reasons that sometimes simultaneous multi-wavelength illumination is preferred and D-PSR could be applied. For example, in imaging flow-cytometry systems, specimens (e.g., parasites or cells of interest) are constantly moving in a flow, and a motion-based PSR approach can be combined with D-PSR to get color images of the flowing micro-objects without the need for sequential multi-color illumination, which would directly improve the flow rate and the throughput of the imaging cytometer.

Finally, it is important to emphasize that the use a color (e.g., a Bayer RGB) image sensor chip, as compared to a monochrome image sensor, has several advantages for holographic microscopy applications. First, color image sensors are much more cost-effective compared to their monochrome versions due to economies of scale and their massive adoption in consumer electronics market, especially in mobile-phones. Second, most of these small pixel pitch CMOS image sensor chips, including the one that is used herein with ~1.1 μm pixel size, are not available for sale in monochrome format, which limits the spatial resolution that one can achieve using on-chip microscopy techniques with a monochrome chip.

Optimization of the Choice of Illumination Wavelengths in D-PSR

The optimal multi-wavelength illumination choice was analyzed based on the spectral characteristics of the Bayer CMOS image sensor chip (Sony IMX85) that was used using a brute force search. It was assumed that the main sources of de-multiplexing error on a single pixel come from: (1) thermal noise of the sensor, and (2) quantization noise. It should be noted that if the three multiplexed wavelengths are chosen to be too close to each other, the cross-talk among channels will be significant and the de-multiplexing matrix will be almost singular, causing any source of error (due to thermal noise and quantization noise) to be significantly amplified.

Figure 12:
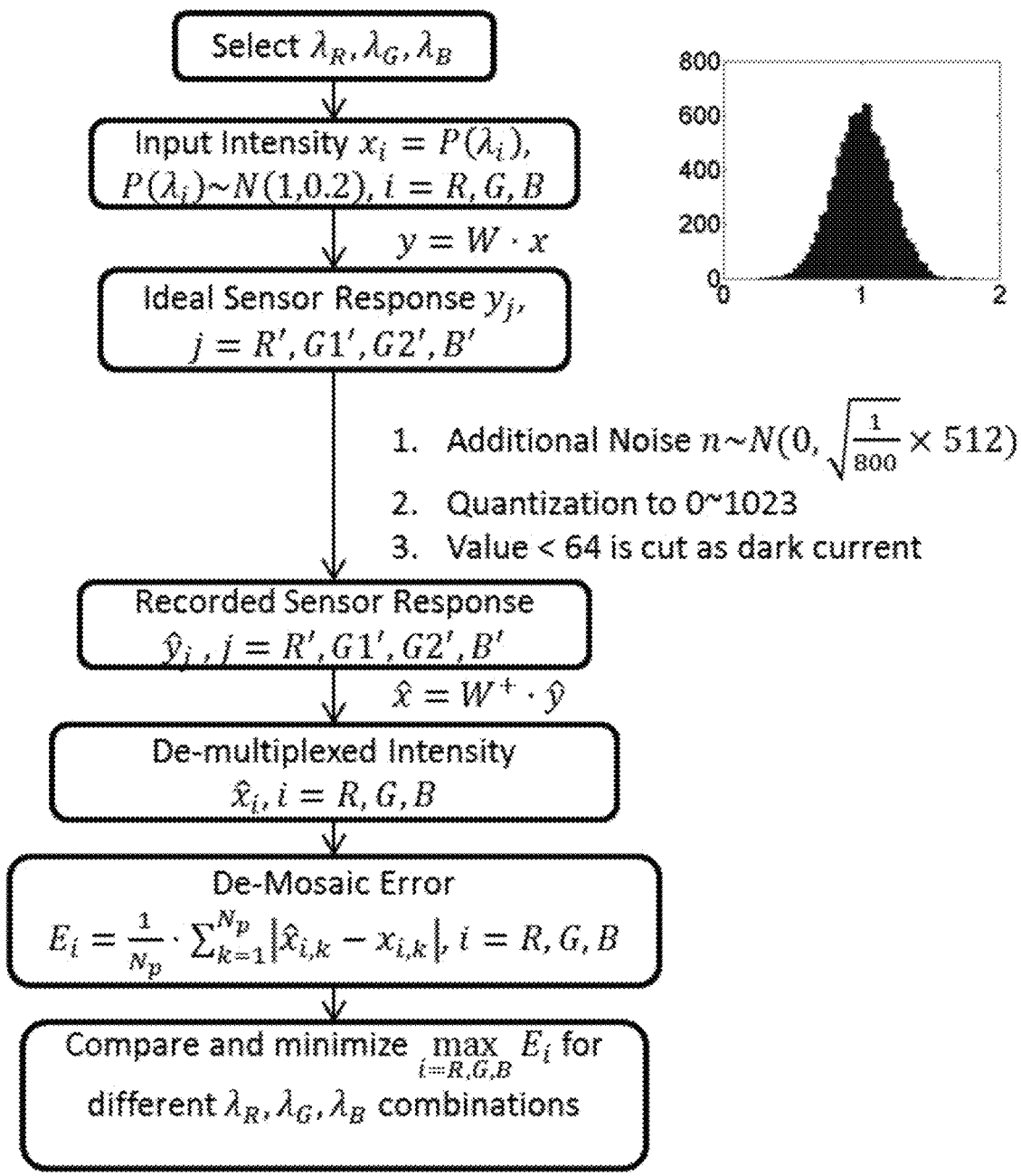
FIG. 12 illustrates a flow-chart of de-multiplexing error calculation for different combinations of multiplexed illumination wavelengths in D-PSR.

As detailed in the flow-chart shown in FIG. 12, a brute force search was performed, where all the possible wavelength combinations were scanned from 400 nm to 700 nm at 1 nm step size and a de-multiplexing error was calculated for each combination. For this calculation, it was first assumed that the input signal for each channel follows a Gaussian distribution with a mean of 1 and a standard deviation of 0.2. Then, using the measured/calibrated sensor response of the Bayer CFA, a cross-talk matrix was generated and the Bayer channel intensities were calculated. Each channel intensity also included a thermal noise term (~3.5%) and was quantized with a bit depth of 10 bits. Next, using Equation (2), the de-multiplexing step was performed for all the RGB intensity points in the Gaussian distribution, the results of which are compared to the input distribution to calculate an average error for each channel. The total error for a given combination of illumination wavelengths is taken as the maximum of these three mean errors arising from R, G and B channels. Based on this combinatorial search, the optimal illumination wavelength trio that has the smallest de-multiplexing error is found to be (456 nm, 570 nm, 651 nm). However, the gradient near this optimal point is actually quite small and therefore a similar level of de-multiplexing error can be practically achieved over a large spectral range (see FIGS. 9A and 9B). For example, a region with a maximum de-multiplexing error of 6% (1.7× of thermal noise level) is shown in FIG. 9A and it spans more than ~50 nm for all three Bayer channels. In FIG. 9B, the cross-sectional 1D-plots of the de-multiplexing error is shown near the choice of multiplexed-illumination wavelengths that was used in the experiments (i.e., 471, 532, 633 nm), confirming that the change of the de-multiplexing error is rather small over a relatively large spectral range.

YUV Color-Space Averaging Method

One of the comparisons to the D-PSR technique is made using the YUV color-space averaging method. In this technique, the color information is retrieved from three low resolution holograms at R, G and B color channels, which are then back-propagated to the sample plane, combined and transformed into YUV color-space, and low-pass filtered by an averaging window size of e.g., 10 pixels on the U and V channels to get rid of twin-image related rainbow artifacts of holographic imaging. The high resolution (i.e., pixel super-resolved) Y channel, which requires the acquisition of N raw holograms (same as D-PSR), and the low resolution U and V channels, which require the acquisition of three raw holograms, are then fused in the YUV color-space, and finally converted into RGB space to get a color image of the specimen.

Demosaicing induced holographic color artifacts that arise due to limited spatial sampling at a Bayer CFA are significantly alleviated in D-PSR through the digital synthesis of spatially overlapping and much smaller effective pixels in each color channel. Furthermore, in D-PSR the pixel-level spectral cross-talk of a Bayer CFA is compensated by digital de-multiplexing. Compared to holographic color imaging using sequential multi-wavelength illumination, this new approach takes 3-fold less number of raw holograms/measurements while also achieving a very similar color imaging performance. D-PSR can be broadly used for high-resolution holographic color imaging and microscopy applications, where wavelength-multiplexing is desired.

While embodiments of the present invention have been shown and described, various modifications may be made without departing from the scope of the present invention. For example, while the method has largely been described using a lens-free embodiment to obtain pixel super-resolution images, the method may also be implemented using a lens, lens set, or lens module located within the optical path. The invention, therefore, should not be limited, except to the following claims, and their equivalents.

What is claimed is:

1. A method of generating a color image of a sample comprising:
    obtaining a plurality of low resolution holographic images of the sample using a color image sensor, the sample illuminated simultaneously by light containing multiple wavelengths or colors, wherein the illuminated sample casts sample holograms on the color image sensor and wherein the plurality of low resolution holographic images are obtained by relative shifts in the x, y, and z direction between the sample holograms at a given axial plane and the color image sensor, wherein at least one lens, lens set, or lens module is located along an optical path between the sample and color image sensor;
    generating a pixel super-resolved hologram of the sample using the plurality of low-resolution holographic images obtained by simultaneous illumination of the sample by light from the multiple wavelengths or colors;
    generating de-multiplexed pixel super-resolved holograms at individual wavelengths or colors using the pixel super-resolved hologram obtained from the simultaneous illumination of the sample by;
    retrieving phase information from the de-multiplexed holograms at each of the wavelengths or colors using a phase retrieval algorithm to obtain a complex hologram at the wavelengths or colors; and
    digitally back-propagating and reconstructing the complex hologram for each of the wavelengths or colors to a sample plane to generate the color image of the sample by combining the reconstruction results of each of the wavelengths or colors.

2. The method of claim 1, wherein the color image sensor comprises a periodic array of pixels, where pixels of the array have multiple wavelength channels or transmission spectra.

3. The method of claim 2, wherein the wavelength channels or transmission spectra are generated by a color filter.

4. The method of claim 3, wherein the CFA is selected from the group consisting of a Bayer filter, RGBE filter, CYYM filter, CYGM filter, RGBW Bayer filter, and RGBW filter.

5. The method of claim 1, further comprising performing saturation correction on the acquired holograms corresponding to the wavelengths or colors.

6. The method of claim 1, further comprising white-balancing the de-multiplexed holograms corresponding to the wavelengths or colors.

7. The method of claim 1, wherein the sample is illuminated simultaneously by light from multiple illumination sources.

8. The method of claim 1, wherein the sample is illuminated simultaneously from a broadband light source that is filtered into a plurality of bands.

9. The method of claim 8, wherein the plurality of bands have different bandwidths.

10. The method of claim 1, wherein the sample comprises a biological sample.

11. The method of claim 1, wherein the phase retrieval algorithm comprises a multi-height (z) phase retrieval algorithm that uses one of the pixel super-resolved holograms at one of the wavelengths or colors and iteratively propagates it to a next (z) measurement plane where the amplitude of the field is partially or entirely replaced with the measured amplitude and continues until a last measurement plane (z) is reached.

12. A system for generating color images of a sample comprising:
    an optically transparent sample holder configured to hold the sample thereon;
    at least one light source configured to simultaneously output multiple wavelengths or colors on a first side of the sample holder;
    a color image sensor disposed on a second side of the sample holder;
    one or more processors configured to execute image processing software thereon, the image processing software:
        obtaining a plurality of low-resolution holographic images of the sample using the color image sensor, wherein the simultaneously illuminated sample casts sample holograms on the color image sensor and wherein the plurality of low-resolution holographic images are obtained by relative x, y, and z directional shifts between sample holograms and the color image sensor;
        generating a pixel super-resolved hologram of the sample using the plurality of low-resolution holographic images obtained by simultaneous illumination of the sample by light from the multiple wavelengths or colors;
        generating de-multiplexed pixel super-resolved holograms at each of the at least multiple wavelengths or colors using the pixel super-resolved hologram obtained from the simultaneous illumination of the sample;
        retrieving phase information from the de-multiplexed holograms at each of the at multiple wavelengths or colors using a phase retrieval algorithm to obtain a complex hologram at each of the multiple wavelengths or colors; and
        digitally back-propagating and reconstructing the complex hologram for each of the multiple wavelengths or colors to a sample plane to generate the color image of the sample by combining the reconstruction results of each of the multiple wavelengths or colors.

13. The system of claim 12, wherein the color image sensor comprises a periodic array of pixels, where pixels of the array have multiple wavelength channels or transmission spectra.

14. The system of claim 12, wherein at least one lens, lens set, or lens module is located along an optical path between the sample and color image sensor.

15. The system of claim 12, wherein the sample is illuminated simultaneously by light from multiple illumination sources.

16. The system of claim 12, wherein the sample is illuminated simultaneously from a broadband light source that is filtered into a plurality of bands.

17. The system of claim 16, wherein the plurality of bands have different bandwidths.

18. The system of claim 12, wherein the relative x, y, and z directional shifts are performed by translation stage coupled to the color image sensor.

19. The system of claim 12, wherein the relative x, y, and z directional shifts are performed by translation stage coupled to the sample holder.

20. The system of claim 12, wherein the relative x, y directional shifts are performed by actuating different light sources.

\* \* \* \* \*